United States Patent
MolavianJazi et al.

(10) Patent No.: US 12,439,402 B2
(45) Date of Patent: Oct. 7, 2025

(54) DCI FIELDS FOR MULTI-CELL SCHEDULING

(71) Applicant: Samsung Electronics Co., Ltd., Suwon-si (KR)

(72) Inventors: Ebrahim MolavianJazi, San Jose, CA (US); Aristides Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 362 days.

(21) Appl. No.: 18/297,492

(22) Filed: Apr. 7, 2023

(65) Prior Publication Data

US 2023/0345460 A1 Oct. 26, 2023

Related U.S. Application Data

(60) Provisional application No. 63/416,811, filed on Oct. 17, 2022, provisional application No. 63/333,385, filed on Apr. 21, 2022.

(51) Int. Cl.
*H04W 72/1263* (2023.01)
*H04W 72/232* (2023.01)

(52) U.S. Cl.
CPC ..... *H04W 72/1263* (2013.01); *H04W 72/232* (2023.01)

(58) Field of Classification Search
CPC ......... H04W 72/0446; H04W 72/1263; H04W 72/232
See application file for complete search history.

(56) References Cited

U.S. PATENT DOCUMENTS

| | | | |
|---|---|---|---|
| 2020/0022078 A1* | 1/2020 | Papasakellariou | .... H04L 5/0048 |
| 2021/0258999 A1* | 8/2021 | Xu | .......... H04L 5/001 |
| 2021/0307044 A1* | 9/2021 | Bae | ......... H04W 72/0446 |
| 2022/0053553 A1* | 2/2022 | Li | .......... H04W 72/23 |

(Continued)

FOREIGN PATENT DOCUMENTS

WO 2022029297 A1 2/2022

OTHER PUBLICATIONS

International Search Report and Written Opinion issued Jul. 14, 2023 regarding International Application No. PCT/KR2023/005440, 9 pages.

(Continued)

*Primary Examiner* — Benjamin H Elliott, IV

(57) ABSTRACT

Apparatuses and methods for DCI fields for multi-cell scheduling. A method includes receiving first information for a set of cells and identifying first time-domain resource allocation (TDRA) tables having a one-to-one mapping with cells in the set of cells. The method further includes receiving second information for a second TDRA table for reception of physical downlink shared channels (PDSCHs) on cells in the set of cells and receiving a physical downlink control channel (PDCCH) that provides a downlink control information (DCI) format that includes a TDRA field that indicates a first row of the second TDRA table. The method further includes determining first time resources for the receptions of the first PDSCHs on the first cells based on first entries, respectively, of the first row of the second TDRA table and receiving the first PDSCHs on the first cells in the first time resources, respectively.

20 Claims, 9 Drawing Sheets

(56) References Cited

U.S. PATENT DOCUMENTS

| | | | | |
|---|---|---|---|---|
| 2022/0304044 | A1* | 9/2022 | Khoshnevisan | H04W 72/0446 |
| 2022/0322341 | A1* | 10/2022 | Tiirola | H04L 5/0044 |
| 2022/0346104 | A1* | 10/2022 | Yi | H04W 72/56 |
| 2023/0049739 | A1* | 2/2023 | Yang | H04L 5/0055 |
| 2023/0156736 | A1* | 5/2023 | He | H04W 72/232 370/329 |
| 2023/0345460 | A1* | 10/2023 | MolavianJazi | H04W 72/232 |
| 2024/0089965 | A1* | 3/2024 | Lin | H04W 72/11 |
| 2024/0204931 | A1* | 6/2024 | Xiong | H04L 5/0053 |

OTHER PUBLICATIONS

Moderator (LG Electronics), "Summary #2 of PDSCH/PUSCH enhancements (Scheduling/HARQ)", 3GPP TSG RAN WG1 #108-e, R1-2202679, Feb. 2022, 82 pages.

"3rd Generation Partnership Project; Technical Specification Group Radio Access Network; NR; Physical channels and modulation (Release 17)", 3GPP TS 38.211 V17.1.0, Mar. 2022, 135 pages.

"3rd Generation Partnership Project; Technical Specification Group Radio Access Network; NR; Multiplexing and channel coding (Release 17)", 3GPP TS 38.212 V17.1.0, Mar. 2022, 197 pages.

"3rd Generation Partnership Project; Technical Specification Group Radio Access Network; NR; Physical layer procedures for control (Release 17)", 3GPP TS 38.213 V17.1.0, Mar. 2022, 245 pages.

"3rd Generation Partnership Project; Technical Specification Group Radio Access Network; NR; Physical layer procedures for data (Release 17)", 3GPP TS 38.214 V17.1.0, Mar. 2022, 225 pages.

"3rd Generation Partnership Project; Technical Specification Group Radio Access Network; NR; Medium Access Control (MAC) protocol specification (Release 17)", 3GPP TS 38.321 V17.0.0, Mar. 2022, 221 pages.

"3rd Generation Partnership Project; Technical Specification Group Radio Access Network; NR; Radio Resource Control (RRC) protocol specification (Release 17)", 3GPP TS 38.331 V17.0.0, Mar. 2022, 1221 pages.

"5G; NR; NR and NG-RAN Overall description; Stage-2 (3GPP TS 38.300 version 17.0.0 Release 17)", ETSI TS 138 300 V17.0.0, May 2022, 207 pages.

Extended European Search Report issued Jun. 3, 2025 regarding Application No. 23792231.5, 10 pages.

MediaTek Inc., "On Multi-cell PDSCH Scheduling via Single DCI", 3GPP TSG RAN WG1 Meeting #104-e, R1-2100611, Jan. 2021, 12 pages.

\* cited by examiner

DCI FIELDS FOR MULTI-CELL SCHEDULING

CROSS-REFERENCE TO RELATED APPLICATION AND CLAIM OF PRIORITY

This application claims priority under 35 U.S.C. § 119(e) to U.S. Provisional Patent Application No. 63/333,385 filed on Apr. 21, 2022, and U.S. Provisional Patent Application No. 63/416,811 filed on Oct. 17, 2022. The above-identified provisional patent applications are hereby incorporated by reference in their entirety.

TECHNICAL FIELD

The present disclosure relates generally to wireless communication systems and, more specifically, to downlink control information (DCI) fields for multi-cell scheduling.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to apparatuses and methods for DCI fields for multi-cell scheduling.

In one embodiment, a method includes receiving first information for a set of cells and identifying first time-domain resource allocation (TDRA) tables having a one-to-one mapping with cells in the set of cells. A row of a first TDRA table from the first TDRA tables indicates time resources for reception of a physical downlink shared channel (PDSCH) on a cell in the set of cells. The method further includes receiving second information for a second TDRA table for reception of PDSCHs on cells in the set of cells and receiving a physical downlink control channel (PDCCH) on a scheduling cell. The PDCCH provides a downlink control information (DCI) format. The DCI format schedules receptions of first PDSCHs on first cells, respectively, in the set of cells. The DCI format includes a TDRA field that indicates a first row of the second TDRA table. The first row comprises first entries having a one-to-one mapping with the first cells. An entry, from the first entries, indicates a row from the first TDRA table. The method further includes determining first time resources for the receptions of the first PDSCHs on the first cells based on the first entries, respectively, of the first row of the second TDRA table and receiving the first PDSCHs on the first cells in the first time resources, respectively.

In another embodiment, a user equipment (UE) includes a transceiver configured to receive first information for a set of cells and a processor operably coupled to the transceiver. The processor is configured to identify first TDRA tables having a one-to-one mapping with cells in the set of cells. A row of a first TDRA table from the first TDRA tables indicates time resources for reception of a PDSCH channel on a cell in the set of cells. The transceiver is configured to receive second information for a second TDRA table for reception of PDSCHs on cells in the set of cells and a PDCCH on a scheduling cell. The PDCCH provides a DCI format. The DCI format schedules receptions of first PDSCHs on first cells, respectively, in the set of cells. The DCI format includes a TDRA field that indicates a first row of the second TDRA table. The first row comprises first entries having a one-to-one mapping with the first cells. An entry, from the first entries, indicates a row from the first TDRA table. The processor is further configured to determine first time resources for the receptions of the first PDSCHs on the first cells based on the first entries, respectively, of the first row of the second TDRA table. The transceiver is further configured to receive the first PDSCHs on the first cells in the first time resources, respectively.

In yet another embodiment, a base station is provided. The base station includes a transceiver configured to transmit first information for a set of cells and a processor operably coupled to the transceiver. The processor is configured to identify first TDRA tables having a one-to-one mapping with cells in the set of cells. A row of a first TDRA table from the first TDRA tables indicates time resources for transmission of a PDSCH on a cell in the set of cells. The transceiver is configured to transmit second information for a second TDRA table for transmission of PDSCHs on cells in the set of cells and a PDCCH on a scheduling cell. The PDCCH provides a DCI format. The DCI format schedules transmissions of first PDSCHs on first cells, respectively, in the set of cells. The DCI format includes a TDRA field that indicates a first row of the second TDRA table. The first row comprises first entries having a one-to-one mapping with the first cells. An entry, from the first entries, indicates a row from the first TDRA table. The processor is further configured to determine first time resources for the transmissions of the first PDSCHs on the first cells based on the first entries, respectively, of the first row of the second TDRA table. The transceiver is further configured to transmit the first PDSCHs on the first cells in the first time resources, respectively.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
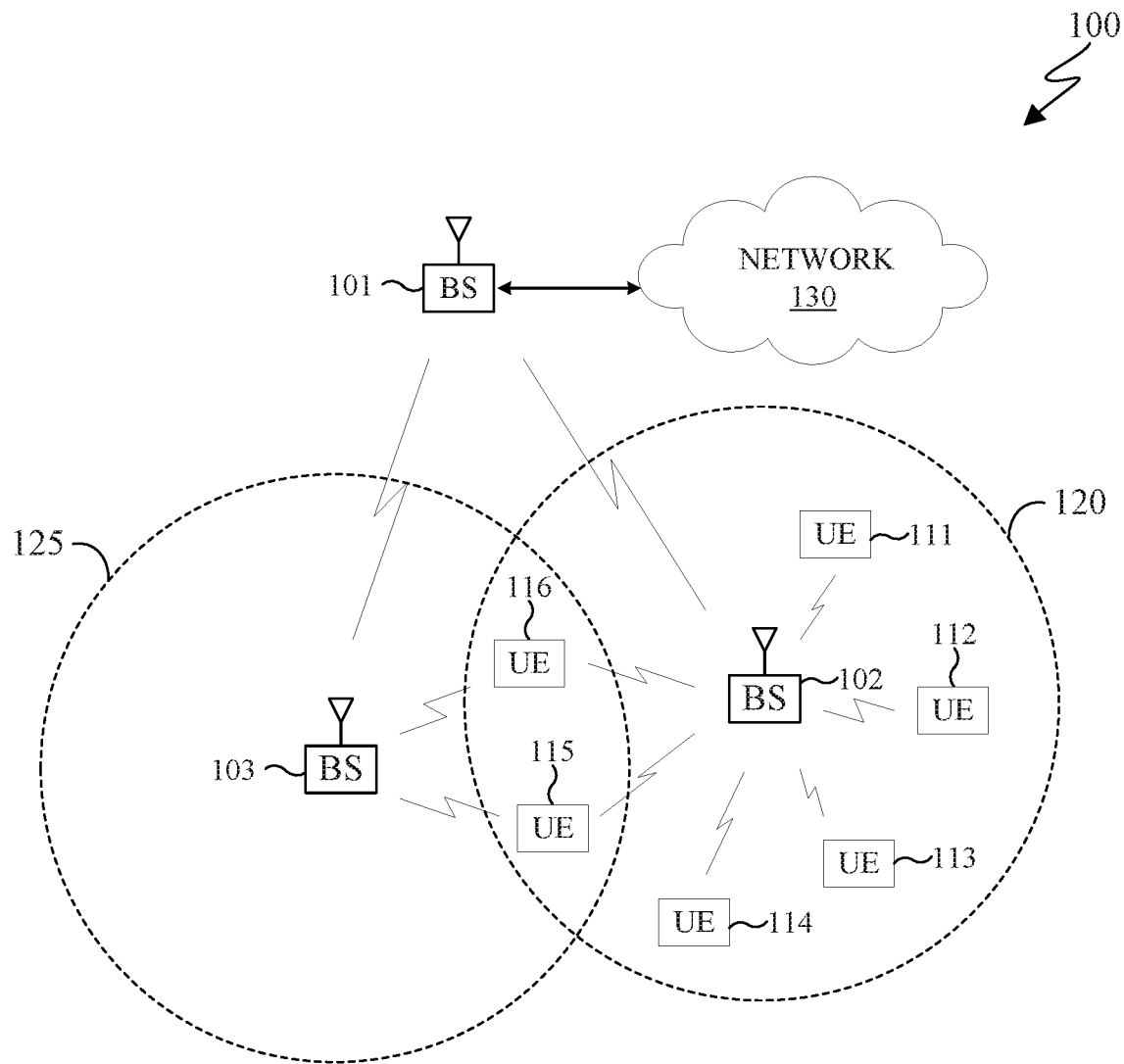
FIG. 1 illustrates an example wireless network according to embodiments of the present disclosure.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents and standards descriptions are hereby incorporated by reference into the present disclosure as if fully set forth herein: 3GPP TS 38.211 Rel-16 v17.1.0, "NR; Physical channels and modulation"; 3GPP TS 38.212 Rel-16 v17.1.0, "NR; Multiplexing and channel coding"; 3GPP TS 38.213 Rel-16 v17.1.0, "NR; Physical layer procedures for control"; 3GPP TS 38.214 Rel-16 v17.1.0, "NR; Physical layer procedures for data"; 3GPP TS 38.321 Rel-16 v17.0.0, "NR; Medium Access Control (MAC) protocol specification"; 3GPP TS 38.331 Rel-16 v17.0.0, "NR; Radio Resource Control (RRC) protocol specification"; 3GPP TS 38.300 Rel-16 v17.0.0, "NR; NR and NG-RAN Overall Description; Stage 2".

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
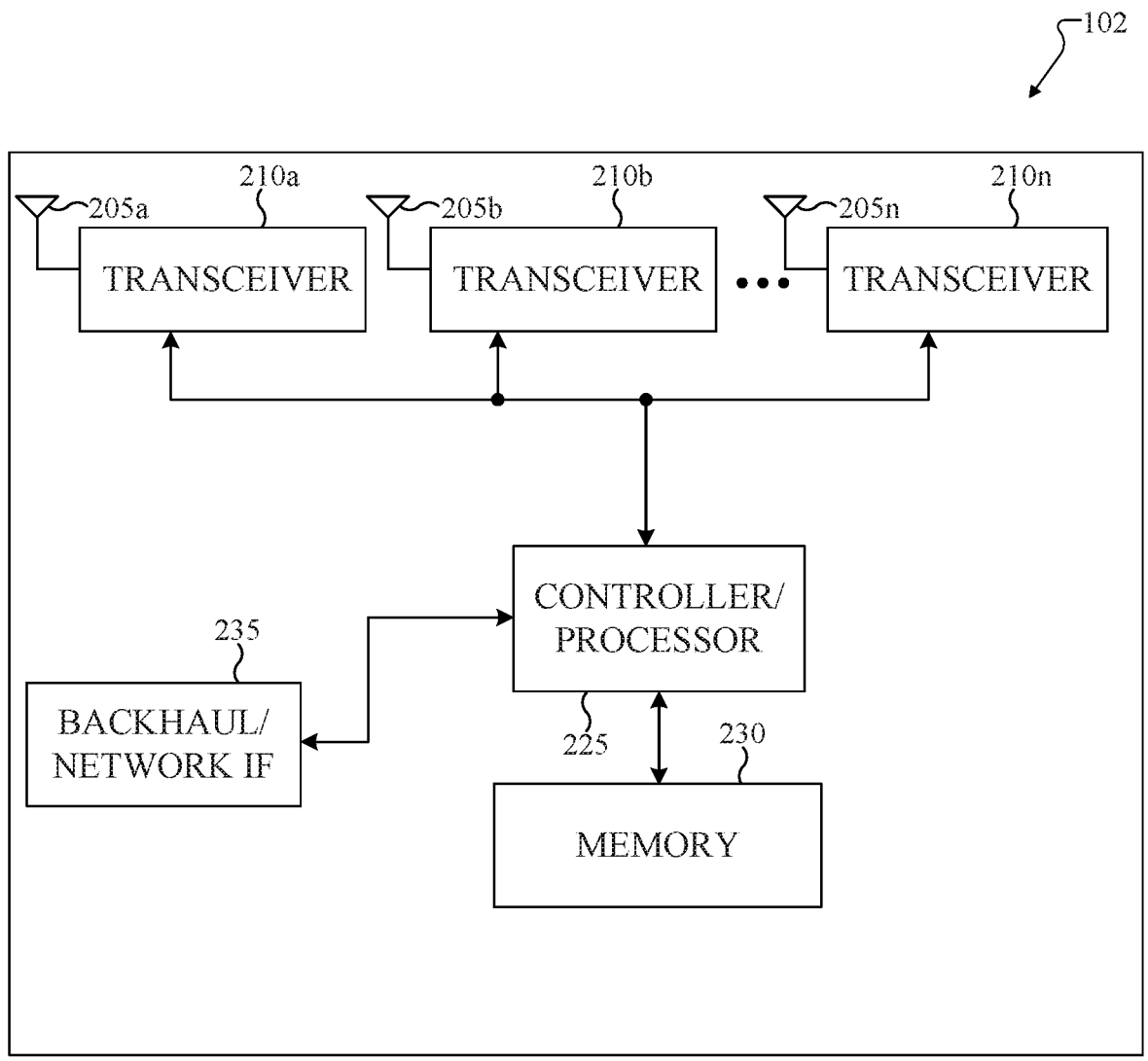
FIG. 2 illustrates an example gNodeB (gNB) according to embodiments of the present disclosure.
Figure 3:
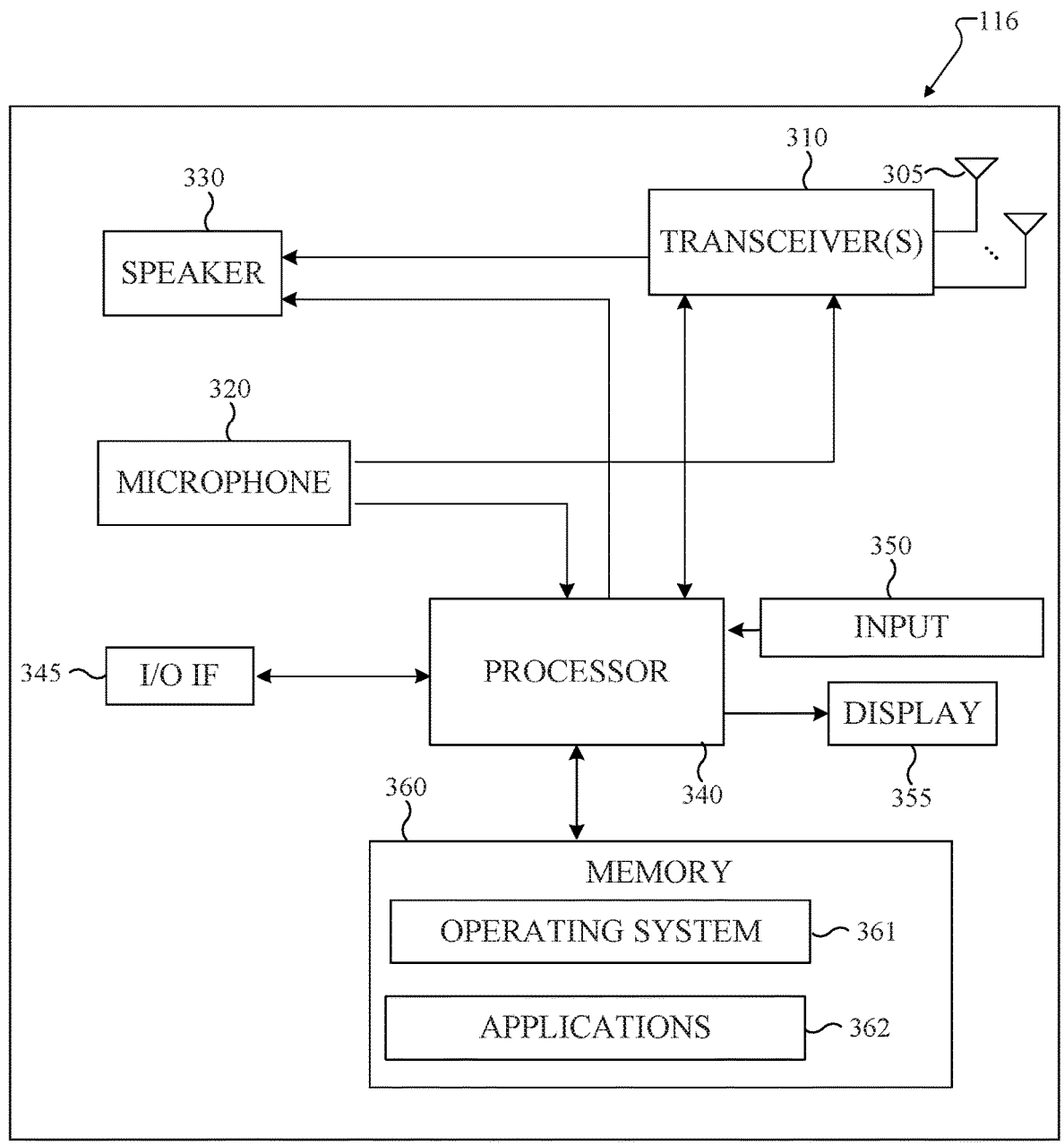
FIG. 3 illustrates an example user equipment (UE) according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network 100 according to this disclosure. The embodiment of the wireless network 100 shown in FIG. 1 is for illustration only. Other embodiments of the wireless network 100 can be used without departing from the scope of this disclosure.

The wireless network 100 includes a gNodeB (gNB) 101, a gNB 102, and a gNB 103. The gNB 101 communicates with the gNB 102 and the gNB 103. The gNB 101 also communicates with at least one Internet Protocol (IP) network 130, such as the Internet, a proprietary IP network, or other data network.

Depending on the network type, other well-known terms may be used instead of "gNodeB" or "gNB," such as "base station" or "access point." For the sake of convenience, the terms "gNodeB" and "gNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an gNB, whether the UE is a mobile device (such as a mobile telephone or smartphone) or is normally considered a stationary device (such as a desktop computer or vending machine). The UE may also be a car, a truck, a van, a drone, or any similar machine or a device in such machines.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115, the UE 116, UE 117 and UE 118. In some embodiments, one or more of the gNBs 101-103 may communicate with each other and with the UEs 111-118 using 5G, long-term evolution (LTE), LTE-A, WiMAX, or other advanced wireless communication techniques. In some embodiments, multiple UEs, e.g., UE 117, UE 118 and UE 119 may communicate directly with each other through device-2-device communication. In some embodiments, a UE, e.g., UE 119, is outside the coverage area of the network, but can communicate with other UEs inside the coverage area of the network, e.g., UE 118, or outside the coverage area of the network.

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of BS 101, BS 102 and BS 103 include 2D antenna arrays as described in embodiments of the present disclosure. In some embodiments, one or more of BS 101, BS 102 and BS 103 support the codebook design and structure for systems having 2D antenna arrays.

Although FIG. 1 illustrates one example of a wireless network 100, various changes may be made to FIG. 1. For example, the wireless network 100 can include any number of gNBs and any number of UEs in any suitable arrangement. Also, the gNB 101 can communicate directly with any number of UEs and provide those UEs with wireless broadband access to the network 130. Similarly, each gNB 102-103 can communicate directly with the network 130 and provide UEs with direct wireless broadband access to the network 130. Further, the gNB 101, 102, and/or 103 can provide access to other or additional external networks, such as external telephone networks or other types of data networks.

As described in more detail below, one or more of the UEs 111-116 include circuitry, programing, or a combination thereof for supporting DCI fields for multi-cell scheduling. In certain embodiments, one or more of the gNBs 101-103 include circuitry, programing, or a combination thereof for supporting DCI fields for multi-cell scheduling.

FIG. 2 illustrates an example gNB 102 according to this disclosure. The embodiment of the gNB 102 shown in FIG. 2 is for illustration only, and other gNBs of FIG. 1 can have the same or similar configuration. However, gNBs come in a wide variety of configurations, and FIG. 2 does not limit the scope of this disclosure to any particular implementation of an gNB. It is noted that gNB 101 and gNB 103 can include the same or similar structure as gNB 102.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. As another example, the controller/processor 225 could support methods for supporting DCI fields for multi-cell scheduling. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Various embodiments of the present disclosure consider enhancements for cross-carrier scheduling operation in a carrier aggregation (CA) framework to support joint scheduling of multiple cells.

In legacy 5G NR systems, a downlink or uplink data transmission can be scheduled only for a single serving cell. In other words, a DCI format provides scheduling information parameters for a PDSCH or a PUSCH on a single serving cell. If the serving cell is a scheduled cell, the UE receives a DCI format for the PDSCH/PUSCH in a PDCCCH that the UE receives on a corresponding scheduling cell. Based on a carrier indication field (CIF) in the DCI format, the UE can determine a serving cell on which the UE can receive the PDSCH or transmit the PUSCH.

However, legacy NR system does not support joint scheduling of multiple PDSCHs or multiple PUSCH on multiple cells using a single/common control signaling, such as by using a single DCI format. For such operation, the UE receives multiple DCI formats, wherein each DCI format can schedule one of the multiple PDSCHs or PUSCHs. Such operation achieves the intended outcome, but with possibly high signaling overhead. In various scenarios, it is possible that several scheduling parameters or corresponding UE operations are shared/common among the multiple PDSCHs or PUSCHs on the jointly scheduled cells, referred to as co-scheduled cells.

For example, the UE may use a same PUCCH resource to transmit HARQ-ACK feedback corresponding to the multiple PDSCHs. Therefore, an indication for the same PUCCH resource (and corresponding operations for PUCCH transmission) may be unnecessarily repeated multiple times. In addition, in some scenarios, such as intra-band CA, it is likely that physical channel conditions are correlated, so various scheduling parameters pertaining link adaptation, MIMO/beamforming operation, and even possibly resource allocation can be common and repeated among the co-scheduled cells. Such unnecessary overhead in control signaling can be significant, especially when the number of co-scheduled cells are large, such as 4-8 cells. Last but not least, CRC field needs to be repeated multiple time, which incurs significant signaling overhead, especially for large number of co-scheduled cells.

Various embodiments of the present disclosure recognize that there is a need for multi-cell scheduling, wherein multiple cells can be jointly scheduled using reduced signaling overhead, such as by using only a single DCI format. In addition, various embodiments of the present disclosure recognize that there is a need to achieve multi-cell scheduling using a reasonable DCI format size, possibly same as a legacy DCI format size or slightly larger, while at the same time, scheduling flexibility is reasonably maintained compared to a scenario with multiple separate DCI formats for each cell. Further, various embodiments of the present disclosure recognize that there is a need to consider a number of co-scheduled cells and a relative similarity of channel/radio conditions among the co-scheduled cells, when designing a method for multi-cell scheduling.

Accordingly, various embodiments of the present disclosure provide methods and apparatus for multi-cell scheduling with reduced signaling overhead. Various embodiments of the present disclosure describe methods for configuration or indication of a set of cells that are jointly scheduled, referred to as co-scheduled cells. Various embodiments of the present disclosure also explain various cell-common scheduling parameters that have common values applicable to all co-scheduled cells, and various cell-specific scheduling parameters that have individual values that are separately provided and applied for each co-scheduled cell.

Several approaches are disclosed for an enhanced multi-cell scheduling that provide values for scheduling parameters for multiple PDSCHs or multiple PUSCHs on multiple co-scheduled cells. One approach considers concatenated DCI formats, wherein few DCI formats are appended to generate a DCI format for multi-cell scheduling. One approach relies on multi-cell mapping, wherein some DCI fields in a DCI format can be interpreted as multiple values for multiple co-scheduled cells, based on one-to-many configured mappings/tables, or configured offset parameters.

One motivation for multi-cell scheduling using a single DCI format is enhanced cross-carrier scheduling operation for larger number of cells, such as 4-8 cells, operating in an intra-band CA framework in frequency bands below 6 GHz or above 6 GHz, referred to as FR1 or FR2, respectively. In general, the embodiments apply to any deployments, verticals, or scenarios including inter-band CA, with eMBB, URLLC and IIoT and extended reality (XR), mMTC and IoT, with sidelink/V2X communications, with multi-TRP/beam/panel, in unlicensed/shared spectrum (NR-U), for non-terrestrial networks (NTN), for aerial systems such as unmanned aerial vehicles (UAVs) such as drones, for private or non-public networks (NPN), for operation with reduced capability (RedCap) UEs, and so on.

Various embodiments of the present disclosure provide mechanisms for supporting multi-cell scheduling with reduced signaling overhead, and are summarized in the following and are fully elaborated further below. Combinations of the embodiments are also applicable, but they are not described in detail for brevity.

In one embodiment, a UE can be provided one or more sets of co-scheduled cells by higher layers. The term set of co-scheduled cells is used to refer to a set of serving cells wherein the UE can be scheduled PDSCH receptions or PUSCH transmissions on two or more or all cells from the set of co-scheduled cells by a single DCI format, or by using complementary methods such as those described herein. In one realization, a DCI format for multi-cell scheduling schedules PDSCHs or PUSCHs on all serving cells from a set of co-scheduled cells. It is also possible that a PDSCH reception or a PUSCH transmission on any cell from the set of co-scheduled cells is scheduled by a DCI format that does not schedule any other PDSCH reception or PUSCH transmission on any other cells from the set of co-scheduled cells, such as for example by a DCI format not having a multi-cell scheduling capability or when there is no traffic associated with the other cells at a given time. Additionally, the UE can be indicated via a DCI format in a PDCCH or via a MAC CE in a PDSCH a subset of a set of co-scheduled cells, wherein cells of the subset can change across different PDCCH monitoring occasions, for example, as indicated by a corresponding DCI format or MAC CE.

In one embodiment, a UE that is configured for multi-cell scheduling can be provided a first set of cell-common scheduling information parameters, whose values apply to all co-scheduled cells, and a second set of cell-specific scheduling information parameters, whose values apply for each corresponding co-scheduled cell. The UE can determine cell-common and cell-specific scheduling information parameters based on the specifications of the system operation, or based on higher layer configuration. In one realization, the specifications for system operations can provide a default structure of cell-common and cell-specific scheduling parameters, when corresponding information is not provided by higher layer configuration for one or more scheduling parameters. For some cell-specific scheduling information parameters, the UE can be provided differential values compared to a reference value wherein the reference value can correspond, for example, to a first scheduled cell from a set of scheduled cells.

In one embodiment, for a UE that is configured a set of co-scheduled cells, a DCI format for multi-cell scheduling can provide full or partial information for values of cell-common and cell-specific fields for scheduling PDSCH receptions or PUSCH transmissions on respective one or more cells from the set of co-scheduled cells. When the DCI format provides partial information, the UE can determine remaining information from RRC signaling, or by using other complementary methods.

In one embodiment, a DCI format for multi-cell scheduling can provide separate values of fields for each of the multiple co-scheduled cells. A first value corresponds to a first cell, a second value corresponds to a second cell, and so on. Therefore, DCI format fields for the multiple cells are concatenated, thereby referring to such DCI format as a concatenated DCI format for multi-cell scheduling. This approach can be beneficial, for example, for co-scheduling cells that have different channel characteristics or configurations, such as for inter-band CA operation, or for co-scheduling a PDSCH reception and a PUSCH transmission.

In one embodiment, a UE can be provided information for multi-cell scheduling of multiple PDSCHs/PDCCHs on multiple respective cells using a multi-cell mapping, wherein a field in a DCI format can be interpreted to provide multiple values for a corresponding scheduling parameter for the multiple co-scheduled cells. Such interpretation can be based on a configured one-to-many mapping/table or based on multiple configured offset values for respective cells that are applied to a reference value indicated by the DCI format. This approach can be beneficial, for example, for co-scheduling cells that have several similar physical channel characteristics or configurations, such as for intra-band CA operation.

In one embodiment, for a UE configured with a set of co-scheduled cells, the UE can be provided information of a set of 'states' (or 'codepoints') that correspond to a set of combinations of cells from the set of co-scheduled cells. Accordingly, a multi-cell scheduling DCI format can indicate the UE operation with respect to a scheduling parameter or a DCI field by indication of a state. The UE can receive a configuration of such states to be commonly applied to multiple scheduling parameters or DCI fields, or the UE can be provided different sets of states separately for each scheduling parameter or DCI field. Furthermore, the states can involve, in addition to cell combinations, parameters associated with a scheduling parameter or DCI field.

In one embodiment, in a first realization, for rate matching patterns applicable to a number of co-scheduled PDSCHs, for a field in the multi-cell scheduling DCI format that concatenates the individual rate matching indicator field needs between 4 to 8 bits, depending on whether a serving cell from the set of co-scheduled cells is configured with one or two rate matching pattern groups. For example, one or two bits for a first co-scheduled cell, and one or two bits for a second co-scheduled cell, and so on.

In one embodiment, in a second realization, for triggering aperiodic zero-power CSI-RS resource sets, cell combinations 'states' can be configured for triggering aperiodic zero-power CSI-RS resource sets that are considered as not available for PDSCH reception for a number of co-scheduled PDSCHs. Herein, a state can correspond to cell combinations only, or can correspond to a combination of pairs of {aperiodic ZP CSI-RS resource set ID, serving cell ID}.

Throughout the present disclosure, the term "configuration" or "higher layer configuration" and variations thereof (such as "configured" and so on) are used to refer to one or more of: a system information signaling such as by a MIB or a SIB (such as SIB1), a common or cell-specific higher layer/RRC signaling, or a dedicated or UE-specific or BWP-specific higher layer/RRC signaling.

Throughout the present disclosure, the term signal quality is used to refer to e.g., RSRP or RSRQ or RSSI or SNR or SINR, with or without filtering such as L1 or L3 filtering, of a channel or a signal such as a reference signal (RS) including SSB, CSI-RS, or SRS.

An antenna port is defined such that the channel over which a symbol on the antenna port is conveyed can be inferred from the channel over which another symbol on the same antenna port is conveyed.

For DM-RS associated with a PDSCH, the channel over which a PDSCH symbol on one antenna port is conveyed can be inferred from the channel over which a DM-RS symbol on the same antenna port is conveyed only if the two symbols are within the same resource as the scheduled PDSCH, in the same slot, and in the same PRG.

For DM-RS associated with a PDCCH, the channel over which a PDCCH symbol on one antenna port is conveyed can be inferred from the channel over which a DM-RS symbol on the same antenna port is conveyed only if the two symbols are within resources for which the UE may assume the same precoding being used.

For DM-RS associated with a PBCH, the channel over which a PBCH symbol on one antenna port is conveyed can be inferred from the channel over which a DM-RS symbol on the same antenna port is conveyed only if the two symbols are within a SS/PBCH block transmitted within the same slot, and with the same block index.

Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

The UE may assume that SS/PBCH blocks transmitted with the same block index on the same center frequency location are quasi co-located with respect to Doppler spread, Doppler shift, average gain, average delay, delay spread, and, when applicable, spatial Rx parameters. The UE shall not assume quasi co-location for any other SS/PBCH block transmissions.

In absence of CSI-RS configuration, and unless otherwise configured, the UE may assume PDSCH DM-RS and SS/PBCH block to be quasi co-located with respect to Doppler shift, Doppler spread, average delay, delay spread, and, when applicable, spatial Rx parameters. The UE may assume that the PDSCH DM-RS within the same CDM group are quasi co-located with respect to Doppler shift, Doppler spread, average delay, delay spread, and spatial Rx. The UE may also assume that DMRS ports associated with a PDSCH are QCL with QCL Type A, Type D (when applicable) and average gain. The UE may further assume that no DM-RS collides with the SS/PBCH block.

A UE can be configured with a list of up to M TCI-State configurations within the higher layer parameter PDSCH-Config to decode PDSCH according to a detected PDCCH with DCI intended for the UE and the given serving cell, where M depends on the UE capability maxNumberConfiguredTCIstatesPerCC. Each TCI-State contains parameters for configuring a quasi co-location (QCL) relationship between one or two downlink reference signals and the DMRS ports of the PDSCH, the DMRS port of PDCCH or the CSI-RS port(s) of a CSI-RS resource. The quasi co-location relationship is configured by the higher layer parameter qcl-Type1 for the first DL RS, and qcl-Type2 for the second DL RS (if configured). For the case of two DL RSs, the QCL types shall not be the same, regardless of whether the references are to the same DL RS or different DL RSs. The quasi co-location types corresponding to each DL RS are given by the higher layer parameter qcl-Type in QCL-Info and may take one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

The UE receives a MAC-CE activation command to map up to N, e.g., N=8 TCI states to the codepoints of the DCI field 'Transmission Configuration Indication'. When the HARQ-ACK information corresponding to the PDSCH carrying the (MAC-CE) activation command is transmitted in slot n, the indicated mapping between TCI states and codepoints of the DCI field 'Transmission Configuration Indication' should be applied after a MAC-CE application time, e.g., starting from the first slot that is after slot n+ $3N_{slot}^{subframe,\mu}$ where $N_{slot}^{subframe,\mu}$ is a number of slot per subframe for subcarrier spacing (SCS) configuration µ.

Independent of the configuration of tci-PresentInDCI and tci-PresentDCI-1-2 in RRC connected mode, if the offset between the reception of the DL DCI and the corresponding PDSCH is less than the threshold timeDurationForQCL and at least one configured TCI state for the serving cell of scheduled PDSCH contains qcl-Type set to 'typeD', the UE may assume that the DM-RS ports of PDSCH(s) of a serving cell are quasi co-located with the RS(s) with respect to the QCL parameter(s) used for PDCCH quasi co-location indication of the CORESET associated with a monitored search space with the lowest controlResourceSetId in the latest slot in which one or more CORESETs within the active BWP of the serving cell are monitored by the UE. In this case, if the qcl-Type is set to 'typeD' of the PDSCH DM-RS is different from that of the PDCCH DM-RS with which they overlap in at least one symbol, the UE is expected to prioritize the reception of PDCCH associated with that CORESET. This also applies to the intra-band CA case (when PDSCH and the CORESET are in different component carriers).

If a UE is configured with enableDefaultTCIStatePerCoresetPoolIndex and the UE is configured by higher layer parameter PDCCH-Config that contains two different values of coresetPoolIndex in different ControlResourceSets, the UE may assume that the DM-RS ports of PDSCH associated with a value of coresetPoolIndex of a serving cell are quasi co-located with the RS(s) with respect to the QCL parameter(s) used for PDCCH quasi co-location indication of the CORESET associated with a monitored search space with the lowest controlResourceSetId among CORESETs, which are configured with the same value of coresetPoolIndex as the PDCCH scheduling that PDSCH, in the latest slot in which one or more CORESETs associated with the same value of coresetPoolIndex as the PDCCH scheduling that PDSCH within the active BWP of the serving cell are monitored by the UE. In this case, if the 'QCL-TypeD' of the PDSCH DM-RS is different from that of the PDCCH DM-RS with which they overlap in at least one symbol and they are associated with same coresetPoolIndex, the UE is expected to prioritize the reception of PDCCH associated with that CORESET. This also applies to the intra-band CA case (when PDSCH and the CORESET are in different component carriers).

If a UE is configured with enable TwoDefaultTCI-States, and at least one TCI codepoint indicates two TCI states, the UE may assume that the DM-RS ports of PDSCH or PDSCH transmission occasions of a serving cell are quasi co-located with the RS(s) with respect to the QCL parameter(s) associated with the TCI states corresponding to the lowest codepoint among the TCI codepoints containing two different TCI states. When the UE is configured by higher layer parameter repetitionScheme set to 'tdmSchemeA' or is configured with higher layer parameter repetitionNumber, and the offset between the reception of the DL DCI and the first PDSCH transmission occasion is less than the threshold timeDurationForQCL, the mapping of the TCI states to PDSCH transmission occasions is determined according to clause 5.1.2.1 by replacing the indicated TCI states with the TCI states corresponding to the lowest codepoint among the TCI codepoints containing two different TCI states based on the activated TCI states in the slot with the first PDSCH transmission occasion. In this case, if the 'QCL-TypeD' in both of the TCI states corresponding to the lowest codepoint among the TCI codepoints containing two different TCI states is different from that of the PDCCH DM-RS with which they overlap in at least one symbol, the UE is expected to prioritize the reception of PDCCH associated with that CORESET. This also applies to the intra-band CA case (when PDSCH and the CORESET are in different component carriers)

In all cases above, if none of configured TCI states for the serving cell of scheduled PDSCH is configured with qcl-Type set to 'typeD', the UE shall obtain the other QCL assumptions from the indicated TCI states for its scheduled PDSCH irrespective of the time offset between the reception of the DL DCI and the corresponding PDSCH.

If the PDCCH carrying the scheduling DCI is received on one component carrier, and the PDSCH scheduled by that DCI is on another component carrier:

The timeDurationForQCL is determined based on the subcarrier spacing of the scheduled PDSCH. If $\mu_{PDCCH} < \mu_{PDSCH}$ an additional timing delay $$d \frac{2^{\mu}PDSCH}{2^{\mu}PDCCH}$$

is added to the timeDurationForQCL, where d is defined in 5.2.1.5.1a-1, otherwise d is zero;

For both the cases, when the UE is configured with enableDefaultBeamForCCS, and when the offset between the reception of the DL DCI and the corresponding PDSCH is less than the threshold timeDurationForQCL, and when the DL DCI does not have the TCI field present, the UE obtains its QCL assumption for the scheduled PDSCH from the activated TCI state with the lowest ID applicable to PDSCH in the active BWP of the scheduled cell.

For PUSCH scheduled by DCI format 0_0 on a cell and if the higher layer parameter enableDefaultBeamPL-ForPUSCH0-0 is set 'enabled', the UE is not configured with PUCCH resources on the active UL BWP and the UE is in RRC connected mode, the UE shall transmit PUSCH according to the spatial relation, if applicable, with a reference to the RS configured with qcl-Type set to 'typeD' corresponding to the QCL assumption of the CORESET with the lowest ID on the active DL BWP of the cell.

For PUSCH scheduled by DCI format 0_0 on a cell and if the higher layer parameter enableDefaultBeamPL-ForPUSCH0 is set 'enabled', the UE is configured with PUCCH resources on the active UL BWP where all the PUCCH resource(s) are not configured with any spatial relation and the UE is in RRC connected mode, the UE shall transmit PUSCH according to the spatial relation, if applicable, with a reference to the RS configured with qcl-Type set to 'typeD' corresponding to the QCL assumption of the CORESET with the lowest ID on the active DL BWP of the cell in case CORESET(s) are configured on the cell.

In Carrier Aggregation (CA), two or more Component Carriers (CCs) are aggregated. A UE may simultaneously receive or transmit on one or multiple CCs depending on its capabilities:

A UE with single timing advance capability for CA can simultaneously receive and/or transmit on multiple CCs corresponding to multiple serving cells sharing the same timing advance (multiple serving cells grouped in one TAG);

A UE with multiple timing advance capability for CA can simultaneously receive and/or transmit on multiple CCs corresponding to multiple serving cells with different timing advances (multiple serving cells grouped in multiple TAGs). NG-RAN ensures that each TAG contains at least one serving cell;

A non-CA capable UE can receive on a single CC and transmit on a single CC corresponding to one serving cell only (one serving cell in one TAG).

CA is supported for both contiguous and non-contiguous CCs. When CA is deployed frame timing and SFN are aligned across cells that can be aggregated, or an offset in multiples of slots between the PCell/PSCell and an SCell is configured to the UE. The maximum number of configured CCs for a UE is 16 for DL and 16 for UL.

When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the Primary Cell (PCell). Depending on UE capabilities, Secondary Cells (SCells) can be configured to form together with the PCell a set of serving cells. The configured set of serving cells for a UE therefore includes one PCell and one or more SCells.

The reconfiguration, addition and removal of SCells can be performed by RRC. At intra-NR handover and during connection resume from RRC_INACTIVE, the network can also add, remove, keep, or reconfigure SCells for usage with the target PCell. When adding a new SCell, dedicated RRC signaling is used for sending all required system information of the SCell i.e., while in connected mode, UEs need not acquire broadcast system information directly from the SCells.

To enable reasonable UE battery consumption when CA is configured, an activation/deactivation mechanism of Cells is supported. When an SCell is deactivated, the UE does not need to receive the corresponding PDCCH or PDSCH, cannot transmit in the corresponding uplink, nor is it required to perform CQI measurements. Conversely, when an SCell is active, the UE shall receive PDSCH and PDCCH (if the UE is configured to monitor PDCCH from this SCell) and is expected to be able to perform CQI measurements. NG-RAN ensures that while PUCCH SCell (a Secondary Cell configured with PUCCH) is deactivated, SCells of secondary PUCCH group (a group of SCells whose PUCCH signaling is associated with the PUCCH on the PUCCH SCell) should not be activated. NG-RAN ensures that SCells mapped to PUCCH SCell are deactivated before the PUCCH SCell is changed or removed.

When reconfiguring the set of serving cells:

SCells added to the set are initially activated or deactivated;

SCells which remain in the set (either unchanged or reconfigured) do not change their activation status (activated or deactivated).

At handover or connection resume from RRC_INACTIVE:

SCells are activated or deactivated.

To enable reasonable UE battery consumption when BA is configured, only one UL BWP for each uplink carrier and one DL BWP or only one DL/UL BWP pair can be active at a time in an active serving cell, all other BWPs that the UE is configured with being deactivated. On deactivated BWPs, the UE does not monitor the PDCCH, does not transmit on PUCCH, PRACH and UL-SCH.

To enable fast SCell activation when CA is configured, one dormant BWP can be configured for an SCell. If the active BWP of the activated SCell is a dormant BWP, the UE stops monitoring PDCCH and transmitting SRS/PUSCH/PUCCH on the SCell but continues performing CSI measurements, AGC and beam management, if configured. A DCI is used to control entering/leaving the dormant BWP for one or more SCell(s) or one or more SCell group(s).

The dormant BWP is one of the UE's dedicated BWPs configured by network via dedicated RRC signaling. The SpCell and PUCCH SCell cannot be configured with a dormant BWP.

Cross-carrier scheduling with the Carrier Indicator Field (CIF) allows the PDCCH of a serving cell to schedule resources on another serving cell but with the following restrictions:

Cross-carrier scheduling does not apply to PCell i.e., PCell is scheduled via its PDCCH;

When an SCell is configured with a PDCCH, that cell's PDSCH and PUSCH are scheduled by the PDCCH on this SCell;

When an SCell is not configured with a PDCCH, that SCell's PDSCH and PUSCH are scheduled by a PDCCH on another serving cell;

The scheduling PDCCH and the scheduled PDSCH/PUSCH can use the same or different numerologies.

Some of the restrictions above may be relaxed. For example, dynamic spectrum sharing (DSS) allows LTE and NR to share the same carrier. As the number of NR devices in a network increases, it is important that sufficient scheduling capacity for NR UEs on the shared carriers is ensured. In the case of DSS operation, PDCCH enhancements for cross-carrier scheduling including can be considered such that PDCCH of an SCell, referred to as a special/scheduling SCell (sSCell), can schedule PDSCH or PUSCH on the P(S)Cell.

The Physical Downlink Control Channel (PDCCH) can be used to schedule DL transmissions on PDSCH and UL transmissions on PUSCH, where the Downlink Control Information (DCI) on PDCCH includes:
  Downlink assignments containing at least modulation and coding format, resource allocation, and hybrid-ARQ information related to DL-SCH;
  Uplink scheduling grants containing at least modulation and coding format, resource allocation, and hybrid-ARQ information related to UL-SCH.

In addition to scheduling, PDCCH can be used for
  Activation and deactivation of configured PUSCH transmission with configured grant;
  Activation and deactivation of PDSCH semi-persistent transmission;
  Notifying one or more UEs of the slot format;
  Notifying one or more UEs of the PRB(s) and OFDM symbol(s) where the UE may assume no transmission is intended for the UE;
  Transmission of TPC commands for PUCCH and PUSCH;
  Transmission of one or more TPC commands for SRS transmissions by one or more UEs;
  Switching a UE's active bandwidth part;
  Initiating a random-access procedure;
  Indicating the UE(s) to monitor the PDCCH during the next occurrence of the DRX on-duration;
  In IAB context, indicating the availability for soft symbols of an IAB-DU.

A UE monitors a set of PDCCH candidates in the configured monitoring occasions in one or more configured COntrol REsource SETs (CORESETs) according to the corresponding search space configurations.

A CORESET includes a set of PRBs with a time duration of 1 to 3 OFDM symbols. The resource units Resource Element Groups (REGs) and Control Channel Elements (CCEs) are defined within a CORESET with each CCE including a set of REGs. Control channels are formed by aggregation of CCE. Different code rates for the control channels are realized by aggregating different number of CCE. Interleaved and non-interleaved CCE-to-REG mapping are supported in a CORESET.

Polar coding is used for PDCCH. Each resource element group carrying PDCCH carries its own DMRS. QPSK modulation is used for PDCCH.

A UE monitors a set of PDCCH candidates in one or more CORESETs on the active DL BWP on each activated serving cell configured with PDCCH monitoring according to corresponding search space sets where monitoring implies decoding each PDCCH candidate according to the monitored DCI formats.

In the downlink, the gNB can dynamically allocate resources to UEs via the C-RNTI on PDCCH(s). A UE monitors the PDCCH(s) in order to find possible assignments when its downlink reception is enabled (activity governed by DRX when configured). When CA is configured, the same C-RNTI applies to all serving cells.

The gNB may pre-empt an ongoing PDSCH transmission to one UE with a latency-critical transmission to another UE. The gNB can configure UEs to monitor interrupted transmission indications using INT-RNTI on a PDCCH. If a UE receives the interrupted transmission indication, the UE may assume that no useful information to that UE was carried by the resource elements included in the indication, even if some of those resource elements were already scheduled to this UE.

In addition, with Semi-Persistent Scheduling (SPS), the gNB can allocate downlink resources for the initial HARQ transmissions to UEs: RRC defines the periodicity of the configured downlink assignments while PDCCH addressed to CS-RNTI can either signal and activate the configured downlink assignment, or deactivate it; i.e. a PDCCH addressed to CS-RNTI indicates that the downlink assignment can be implicitly reused according to the periodicity defined by RRC, until deactivated. When required, retransmissions are explicitly scheduled on PDCCH(s).

The dynamically allocated downlink reception overrides the configured downlink assignment in the same serving cell, if they overlap in time. Otherwise, a downlink reception according to the configured downlink assignment is assumed, if activated.

The UE may be configured with up to 8 active configured downlink assignments for a given BWP of a serving cell. When more than one is configured:
  The network decides which of these configured downlink assignments are active at a time (including all of them); and
  Each configured downlink assignment is activated separately using a DCI command and deactivation of configured downlink assignments is done using a DCI command, which can either deactivate a single configured downlink assignment or multiple configured downlink assignments jointly.

PUSCH may be scheduled with DCI on PDCCH, or a semi-static configured grant may be provided over RRC, where two types of operation are supported:
  The first PUSCH is triggered with a DCI, with subsequent PUSCH transmissions following the RRC configuration and scheduling received on the DCI, or
  The PUSCH is triggered by data arrival to the UE's transmit buffer and the PUSCH transmissions follow the RRC configuration.

In the uplink, the gNB can dynamically allocate resources to UEs via the C-RNTI on PDCCH(s). A UE monitors the PDCCH(s) in order to find possible grants for uplink transmission when its downlink reception is enabled (activity governed by DRX when configured). When CA is configured, the same C-RNTI applies to all serving cells.

The gNB may cancel a PUSCH transmission, or a repetition of a PUSCH transmission, or an SRS transmission of a UE for another UE with a latency-critical transmission. The gNB can configure UEs to monitor cancelled transmission indications using CI-RNTI on a PDCCH. If a UE receives the cancelled transmission indication, the UE shall cancel the PUSCH transmission from the earliest symbol overlapped with the resource or the SRS transmission overlapped with the resource indicated by cancellation.

In addition, with Configured Grants, the gNB can allocate uplink resources for the initial HARQ transmissions and HARQ retransmissions to UEs. Two types of configured uplink grants are defined:
  With Type 1, RRC directly provides the configured uplink grant (including the periodicity).
  With Type 2, RRC defines the periodicity of the configured uplink grant while PDCCH addressed to CS-RNTI can either signal and activate the configured uplink grant, or deactivate it; i.e., a PDCCH addressed to CS-RNTI indicates that the uplink grant can be implicitly reused according to the periodicity defined by RRC, until deactivated.

If the UE is not configured with enhanced intra-UE overlapping resources prioritization, the dynamically allocated uplink transmission overrides the configured uplink grant in the same serving cell, if they overlap in time. Otherwise, an uplink transmission according to the configured uplink grant is assumed, if activated.

If the UE is configured with enhanced intra-UE overlapping resources prioritization, in case a configured uplink grant transmission overlaps in time with dynamically allocated uplink transmission or with another configured uplink grant transmission in the same serving cell, the UE prioritizes the transmission based on the comparison between the highest priority of the logical channels that have data to be transmitted and which are multiplexed or can be multiplexed in MAC PDUs associated with the overlapping resources. Similarly, in case a configured uplink grant transmissions or a dynamically allocated uplink transmission overlaps in time with a scheduling request transmission, the UE prioritizes the transmission based on the comparison between the priority of the logical channel which triggered the scheduling request and the highest priority of the logical channels that have data to be transmitted and which are multiplexed or can be multiplexed in MAC PDU associated with the overlapping resource. In case the MAC PDU associated with a deprioritized transmission has already been generated, the UE keeps it stored to allow the gNB to schedule a retransmission. The UE may also be configured by the gNB to transmit the stored MAC PDU as a new transmission using a subsequent resource of the same configured uplink grant configuration when an explicit retransmission grant is not provided by the gNB.

Retransmissions other than repetitions are explicitly allocated via PDCCH(s) or via configuration of a retransmission timer.

The UE may be configured with up to 12 active configured uplink grants for a given BWP of a serving cell. When more than one is configured, the network decides which of these configured uplink grants are active at a time (including all of them). Each configured uplink grant can either be of Type 1 or Type 2. For Type 2, activation and deactivation of configured uplink grants are independent among the serving cells. When more than one Type 2 configured grant is configured, each configured grant is activated separately using a DCI command and deactivation of Type 2 configured grants is done using a DCI command, which can either deactivate a single configured grant configuration or multiple configured grant configurations jointly.

When SUL is configured, the network should ensure that an active configured uplink grant on SUL does not overlap in time with another active configured uplink grant on the other UL configuration.

For both dynamic grant and configured grant, for a transport block, two or more repetitions can be in one slot, or across slot boundary in consecutive available slots with each repetition in one slot. For both dynamic grant and configured grant Type 2, the number of repetitions can be also dynamically indicated in the L1 signaling. The dynamically indicated number of repetitions shall override the RRC configured number of repetitions, if both are present.

In Multiple Transmit/Receive Point (multi-TRP) operation, a serving cell can schedule UE from two TRPs, providing better PDSCH coverage, reliability and/or data rates.

There are two different operation modes for multi-TRP: single-DCI and multi-DCI. For both modes, control of uplink and downlink operation is done by both physical layer and MAC. In single-DCI mode, UE is scheduled by the same DCI for both TRPs and in multi-DCI mode, UE is scheduled by independent DCIs from each TRP.

HARQ operation is supported for DL reception. Asynchronous Incremental Redundancy HARQ is supported. The gNB provides the UE with the HARQ-ACK feedback timing either dynamically in the DCI or semi-statically in an RRC configuration. Retransmission of HARQ-ACK feedback is supported for operation with shared spectrum channel access by using enhanced dynamic codebook and/or one-shot triggering of HARQ-ACK transmission for all configured CCs and HARQ processes in the PUCCH group. The UE may be configured to receive code block group-based transmissions where retransmissions may be scheduled to carry a sub-set of all the code blocks of a TB.

HARQ operation is supported for UL transmission. Asynchronous Incremental Redundancy HARQ is supported. The gNB schedules each uplink transmission and retransmission using the uplink grant on DCI. For operation with shared spectrum channel access, UE can also retransmit on configured grants. The UE may be configured to transmit code block group-based transmissions where retransmissions may be scheduled to carry a sub-set of all the code blocks of a transport block.

Up to two HARQ-ACK codebooks corresponding to a priority (high/low) can be constructed simultaneously. For each HARQ-ACK codebook, more than one PUCCH for HARQ-ACK transmission within a slot is supported. Each PUCCH is limited within one sub-slot, and the sub-slot pattern is configured per HARQ-ACK codebook.

The HARQ functionality ensures delivery between peer entities at Layer 1. A single HARQ process supports one TB when the physical layer is not configured for downlink/uplink spatial multiplexing, and when the physical layer is configured for downlink/uplink spatial multiplexing, a single HARQ process supports one or multiple TBs.

In case of CA, the multi-carrier nature of the physical layer is only exposed to the MAC layer for which one HARQ entity is required per serving cell. In both uplink and downlink, there is one independent HARQ entity per serving cell and one transport block is generated per assignment/grant per serving cell in the absence of spatial multiplexing. Each transport block and its potential HARQ retransmissions are mapped to a single serving cell.

Physical uplink control channel (PUCCH) carries the Uplink Control Information (UCI) from the UE to the gNB. UCI includes at least hybrid automatic request acknowledgement (HARQ-ACK) information, scheduling request (SR), and channel state information (CSI).

Throughout the present disclosure, embodiments are described in terms of multiple PDSCHs or multiple PUSCHs that are jointly scheduled on multiple serving cells, such as a subset/set of cells from among one or more sets of co-scheduled cells.

The embodiments are generic and can apply to various other scenarios such as when a UE is jointly scheduled to receive/transmit multiple PDSCHs/PUSCHs:
  from/to multiple transmission-reception points (TRPs) or other communication entities, such as multiple distributed units (DUs) or multiple remote radio heads (RRHs) and so on, for example, in a distributed MIMO operation, wherein TRPs/DUs/RRHs can be associated with one or more cells; or
  in multiple time units, such as multiple slots or multiple transmission time intervals (TTIs); or
  on one or more TRPs/cells, wherein the UE can receive/transmit more than one PDSCH/PUSCH on each co-scheduled TRP/cell; or
  for multiple transport blocks (TBs), or for multiple codewords (CWs) corresponding to single TB or multiple TBs; or for multiple semi-persistently scheduled PDSCHs (SPS PDSCHs) or for multiple configured grant PUSCHs (CG PUSCHs) that are jointly activated on one or multiple TRPs/cells.

Accordingly, any reference to "co-scheduled cells" can be replaced with/by "co-scheduled TRPs/DUs/RRHs" or "co-scheduled slots/TTIs", or "co-scheduled PDSCHs/PUSCHs", or "co-scheduled TBs/CWs", or "co-scheduled SPS-PDSCHs/CG-PUSCHs", and so on. Similar for other related terms, such as "multi-cell scheduling", and so on.

Various embodiments consider reception of multiple PDSCHs or transmission of multiple PUSCHs on respective cells, including carriers of a same cell such as on an UL carrier (also referred to as, a normal UL (NUL) carrier) or a supplemental UL (SUL) carrier. The embodiments also apply to cases where scheduling is for a mixture of PDSCHs and PUSCHs. For example, the UE can receive first PDSCHs on respective first cells and can transmit second PUSCHs on respective second cells, wherein the first PDSCHs and the second PUSCHs are jointly scheduled.

In one embodiment, a UE can be provided one or more sets of co-scheduled cells by higher layers. The term set of co-scheduled cells is used to refer to a set of serving cells wherein the UE can be scheduled PDSCH receptions or PUSCH transmissions on two or more or all cells from the set of co-scheduled cells by a single DCI format, or by using complementary methods such as those described herein. In one realization, a DCI format for multi-cell scheduling schedules PDSCHs or PUSCHs on all serving cells from a set of co-scheduled cells. It is also possible that a PDSCH reception or a PUSCH transmission on any cell from the set of co-scheduled cells is scheduled by a DCI format that does not schedule any other PDSCH reception or PUSCH transmission on any other cells from the set of co-scheduled cells, such as for example by a DCI format not having a multi-cell scheduling capability or when there is no traffic associated with the other cells at a given time. Additionally, the UE can be indicated via a DCI format in a PDCCH or via a MAC CE in a PDSCH a subset of a set of co-scheduled cells, wherein cells of the subset can change across different PDCCH monitoring occasions, for example, as indicated by a corresponding DCI format or MAC CE.

Herein, operation with a cell or a set of cells refers to DL/UL transmissions on the cell(s), such as PDSCH receptions or PUSCH transmissions across the cell(s). Operation can also include other UE procedures or behaviors corresponding to DL/UL transmissions, such as reporting HARQ-ACK information, beam/CSI measurement or reporting, transmission or reception or processing of UL/DL reference signals, and so on.

In one example, the UE can be configured a number of sets of co-scheduled cells by higher layer signaling, such as by a UE-specific RRC configuration. For example, the UE can be configured a first set of cells, such as {cell #0, cell #1, cell #4, cell #7} and a second set {cell #2, cell #3, cell #5, cell #6}. The multiple sets of co-scheduled cells can be scheduled from a same scheduling cell or from different scheduling cells.

In one example, a set of co-scheduled cells can include a PCell/PSCell and one or more SCells. In another example, a set of co-scheduled cells can include only SCells. In one example, a scheduling cell can belong to a set of co-scheduled cells. In another example, the UE does not expect that a scheduling cell belongs to a set of co-scheduled cells.

In one example, per the specifications for the system operation, a set of co-scheduled cells is defined as a set of all scheduled cells from a same scheduling cell and additional higher layer configuration is not required for the set of co-scheduled cells. Accordingly, a DCI format for multi-cell scheduling, or other complementary methods, can jointly schedule any number of scheduled cells that have a same scheduling cell.

In another example, a set of co-scheduled cells can have two or more scheduling cells. For example, a UE can receive a DCI format for scheduling multiple co-scheduled cells on a first scheduling cell in a first PDCCH monitoring occasion, or on a second scheduling cell in a second PDCCH monitoring occasion. The DCI format can be one with CRC scrambled with any RNTI or restricted to CRC scrambled by a RNTI provided by UE-specific RRC signaling such as a C-RNTI, CS-RNTI, or MCS-C-RNTI. Such PDCCH monitoring from two scheduling cells can be simultaneous, for example in a same slot, or can be non-overlapping, such as in different slots (per higher layer configuration, or per indication in a PDCCH or via a MAC CE). The UE may or may not expect that both the first scheduling cell and the second scheduling cell schedule transmissions or receptions on a same cell. The UE can also monitor PDCCH for detection of a DCI format providing scheduling only on one cell from the set of co-scheduled cells (single-cell scheduling DCI format). Also, for single-cell scheduling, the UE may be configured to monitor PDCCH for a first scheduled cell on (only) the first scheduling cell, and monitor PDCCH for a second scheduled cell on (only) the second scheduling cell. In such a case, scheduling by two scheduling cells may apply only to multi-cell scheduling and may not apply to single-cell scheduling.

Different sets of co-scheduled cells can have a same number of cells, or can have different numbers of cells, for example, based on a separate configuration of scheduled cells per set of co-scheduled cells.

A UE can report one or more of: a maximum number of sets of co-scheduled cells, or a maximum number of cells within a set of co-scheduled cells, or a maximum total number of co-scheduled cells across different sets, or a maximum number of co-scheduled cells per PDCCH monitoring occasion, that the UE can support as capability(-ies) to the gNB. In one example, a UE capability for one or more of: a number of set(s) of co-scheduled cells, or a number of cells within each set of co-scheduled cells, or a total number of co-scheduled cells, or a number of co-scheduled cells per PDCCH monitoring occasion can depend on an operating frequency band or a frequency range.

A UE can also be configured a number of cells that do not belong to any of set(s) of co-scheduled cells. For example, the UE can be configured a cell #8 that does not belong to either the first set or the second set in the previous example.

In one example, restrictions can apply for co-scheduled cells and a UE can expect that co-scheduled cells in a corresponding set:
- have a same numerology (SCS configuration and CP); or
- have a same numerology for respective active DL/UL BWPs; or
- have a same duplex configuration, for example, all cells have FDD configuration, or all cells have TDD configuration; or
- are within a same frequency band (intra-band CA) or within a same frequency range (such as FR1 only or FR2 only).

A serving cell can belong only to a single set of co-scheduled cells, so that the sets of co-scheduled cells do not include any common cell, or can belong to multiple sets of co-scheduled cells to enable larger scheduling flexibility to a serving gNB. For example, a serving cell can belong to a first set of co-scheduled cells and to a second set of co-scheduled cells, when cells in the first and second sets of co-scheduled cells have a common feature such as a common numerology, duplex configuration, operating frequency band/range, and so on. In a further example, a serving cell can belong to both a first set of co-scheduled cells and to a second set of co-scheduled cells, when the serving cell has a first common feature with cells in the first set of co-scheduled cells, and a second common feature with cells in the second set of co-scheduled cells, wherein the first common feature can be different from the second common feature.

In a first approach, a UE expects to be provided multi-cell scheduling for all cells in a set of co-scheduled cells. For example, for a first set of co-scheduled cells including cells {cell #0, cell #1, cell #4, cell #7}, a DCI format schedules PDSCH receptions or PUSCH transmissions on all four cells in the first set of co-scheduled cells {cell #0, cell #1, cell #4, cell #7}.

In a second approach, the UE can be provided multi-cell scheduling for a subset of a set of co-scheduled cells. For example, a DCI format can schedule PDSCH receptions or PUSCH transmissions on only two cells, such as {cell #0, cell #4}, from the first set of cells. For example, the UE can be configured a set-level CIF that corresponds to a set of co-scheduled cells. For example, the UE can be provided a first CIF value corresponding to a first set of co-scheduled cells, and a second CIF value corresponding to a second set of co-scheduled cells. 'Accordingly, the UE can determine that a DCI format for multi-cell scheduling corresponds to the first or the second set of co-scheduled cell based on whether the DCI format includes the first or the second CIF value. In one example, the set-level CIF values are separate from cell-level CIF values that are provided for single-cell scheduling of a single (or multiple) PDSCH(s) or PUSCH(s) on a single scheduled cell.

In a first option for the second approach, the subset of cells can be indicated by a MAC CE. Such a MAC CE command can include one or more of: an indication for activation or deactivation/release of a subset of cells; an indication for a number of sets of co-scheduled cells; or an indication for a number of subsets of co-scheduled cells from a corresponding number of sets of co-scheduled cells.

For example, a MAC CE activates a first subset of a set of co-scheduled cells and subsequent DCI format(s) for multi-cell scheduling apply to the first subset of cells activated by the MAC CE. The UE can receive another MAC CE command that deactivates the first subset of co-scheduled cells, or activates a second subset of co-scheduled cells, wherein the second subset can be a subset of the same set of co-scheduled cells or a subset of a different set of co-scheduled cells. If a UE receives a MAC CE that deactivates the first subset of co-scheduled cells, but does not activate a second subset of co-scheduled cells, in one alternative, the UE does not expect to receive a DCI format for multi-cell scheduling, and the UE may not monitor PDCCH according to respective search space sets, until the UE receives a new MAC CE that activates a second subset of co-scheduled cells. In another alternative, the UE can receive DCI format(s) for multi-cell scheduling even before receiving a new MAC CE that activates a second subset of co-scheduled cells, but the UE expects to be provided an indication for a subset of co-scheduled cells by the DCI format(s), or by using complementary methods such as those described herein, for multi-cell scheduling.

In a second option for the second approach, the subset of the set of co-scheduled cells can be provided by a DCI format in a PDCCH/PDSCH. The subset of cells can change between PDCCH monitoring occasions (MOs) for PDSCH/PUSCH scheduling as indicated by a corresponding DCI format. For example, a first DCI format in a first PDCCH MO indicates scheduling on a first subset of cells, while a second DCI format in a second PDCCH MO indicates scheduling on a second subset of cells. In one example, a DCI format for multi-cell scheduling provides indexes of cells that are co-scheduled or a configured index for the subset of co-scheduled cells or CIF values corresponding to the co-scheduled cells. For example, RRC signaling can indicate first/second/third indexes and corresponding first/second/third subsets from a set of co-scheduled cells (or first/second/third sets of co-scheduled cells), a fourth index can correspond to all cells from the set of co-scheduled cells (or to all sets of co-scheduled cells), and a first field of 2 bits in a DCI format can provide a value for the index to indicate the scheduled cells. It is also possible to include a 1-bit flag field to indicate whether the DCI format is for single-cell scheduling or for multi-cell scheduling in order for a UE to accordingly interpret the other fields of the DCI format. Then, for single-cell scheduling, the first field can be interpreted as a CIF field in case of cross-carrier scheduling. In another example, a DCI format for multi-cell scheduling provides a number of co-scheduled cells, and the indexes of the co-scheduled cells are provided by additional methods, such as by an additional DCI format or by higher layer signaling as described herein.

In a third option for the second approach, a UE can determine the indexes for the co-scheduled cells. For example, the UE can determine the indexes for the co-scheduled cells based on a PDCCH monitoring parameter, such as:

a CORESET index; or a search space set index, or a carrier indicator parameter n_CI corresponding to the search space set index; or a set of CCEs in the search space set or a first/last CCE in the search space set; in which the UE has received the DCI format for multi-cell scheduling.

According to the third option, the UE can be configured a mapping among values for PDCCH monitoring parameters, such as search space sets, and a number of co-scheduled cells or indexes of the co-scheduled cells. In one example, a first value for parameter n_CI in a search space set can indicate a first subset of co-scheduled cells, and a second value for parameter n_CI in the search space set can indicate a second subset of co-scheduled cells. According to this example, the parameter n_CI can correspond to a single cell (legacy behavior) or can correspond to a group of cells, such as a subset/set of co-scheduled cells.

Figure 4:
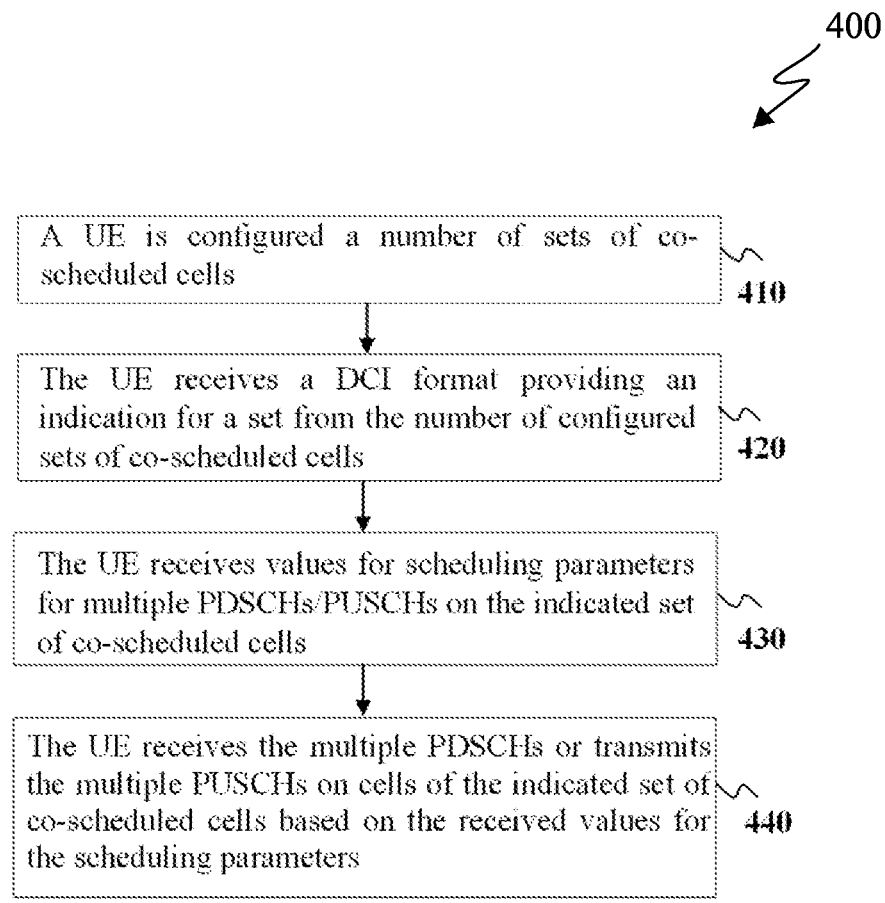
FIG. 4 illustrates a method for multi-cell scheduling for a UE that is configured a number of sets of co-scheduled cells according to embodiments of the present disclosure.

FIG. 4 illustrates a method 400 for multi-cell scheduling for a UE that is configured a number of sets of co-scheduled cells according to embodiments of the present disclosure. The embodiment of the method 400 for multi-cell scheduling for a UE that is configured a number of sets of co-scheduled cells illustrated in FIG. 4 is for illustration only. FIG. 4 does not limit the scope of this disclosure to any particular implementation of the method 400 for multi-cell scheduling for a UE that is configured a number of sets of co-scheduled cells.

As illustrated in FIG. 4, the method 400 begins at step 410, where a UE (such as the UE 116) is configured a number of sets of co-scheduled cells. At step 420, the UE receives a DCI format that includes a field with a value that provides an indication for a set from the number of configured sets of co-scheduled cells. It is also possible that the indication is alternatively or additionally provided via higher layer configuration or a MAC CE command. At step 430, the UE receives values for scheduling parameters by the DCI format for multiple PDSCHs/PUSCHs on cells of the indicated set of co-scheduled cells. At step 440, the UE receives the multiple PDSCHs or transmits the multiple PUSCHs on the indicated set of co-scheduled cells based on the received values for the scheduling parameters.

It is noted that, when a cell is configured to be in a set of co-scheduled cells, the UE can still receive a DCI format that schedules a PDSCH reception or PUSCH transmission only on the cell (single-cell scheduling DCI format). The UE can distinguish a single-cell scheduling DCI format from a multi-cell scheduling DCI format via various methods, such as a DCI format size, or an RNTI used for scrambling a CRC of a DCI format for multi-cell scheduling, or by an explicit indication by a corresponding field in the DCI format.

A set of DL/UL transmissions on a respective set/subset of cells that are jointly scheduled by a single DCI format, or by using complementary methods such as those described herein embodiment, can refer to multiple PDSCHs or multiple PUSCHs that may or may not overlap in time. For example, the UE can be indicated to receive multiple PDSCHs or to transmit multiple PUSCHs on multiple co-scheduled cells wherein all receptions/transmissions are in a same slot or at least one reception/transmission is in a different slot than the remaining ones.

Multi-cell scheduling can be an optional UE feature with capability signaling that can additionally be separate for PDSCH receptions and for PUSCH transmissions. For example, a UE can report a capability for a maximum number of {2, 4, 8, 16} co-scheduled cells for the DL and a maximum of {2, 4} co-scheduled cells for the UL.

In one embodiment, a UE that is configured for multi-cell scheduling can be provided a first set of cell-common scheduling information parameters, whose values apply to all co-scheduled cells, and a second set of cell-specific scheduling information parameters, whose values apply for each corresponding co-scheduled cell. The UE can determine cell-common and cell-specific scheduling information parameters based on the specifications of the system operation, or based on higher layer configuration. In one realization, the specifications for system operations can provide a default structure of cell-common and cell-specific scheduling parameters, when corresponding information is not provided by higher layer configuration for one or more scheduling parameters. For some cell-specific scheduling information parameters, the UE can be provided differential values compared to a reference value wherein the reference value can correspond, for example, to a first scheduled cell from a set of scheduled cells.

For example, a categorization for cell-common vs. cell-specific scheduling information parameters can be based on whether or not channel/MIMO characteristics are relatively similar among the co-scheduled cells.

In one realization, a UE is configured a number of sets of co-scheduled cells. The UE is configured a first set of cell-common scheduling parameters, and a second set of cell-specific scheduling parameters. The UE receives an indication for multiple co-scheduled cells from the number of configured sets of co-scheduled cells. The UE receives, for each parameter from the first set of cell-common scheduling parameters, a single value that is applicable for multiple PDSCHs/PUSCHs on the indicated multiple co-scheduled cells. The UE receives, for each parameter from the second set of cell-specific scheduling parameters, multiple values that are respectively applicable for multiple PDSCHs/PUSCHs on the indicated multiple co-scheduled cells. The UE receives the multiple PDSCHs or transmits the multiple PUSCHs on the indicated multiple co-scheduled cells based on the received values for the cell-common and cell-specific scheduling parameters.

In one example, for a cell-specific scheduling parameter, the UE can be provided a first value, and one or more differential values relative to the first value. Such operation can be beneficial to reduce signaling overhead. For example, the first value can be provided for a first cell among the co-scheduled cells. For example, a UE can be provided the first value via higher layer signaling or in a DCI format for multi-cell scheduling and can be provided the differential values in the same DCI format or by using various other methods such as those described herein.

Figure 5:
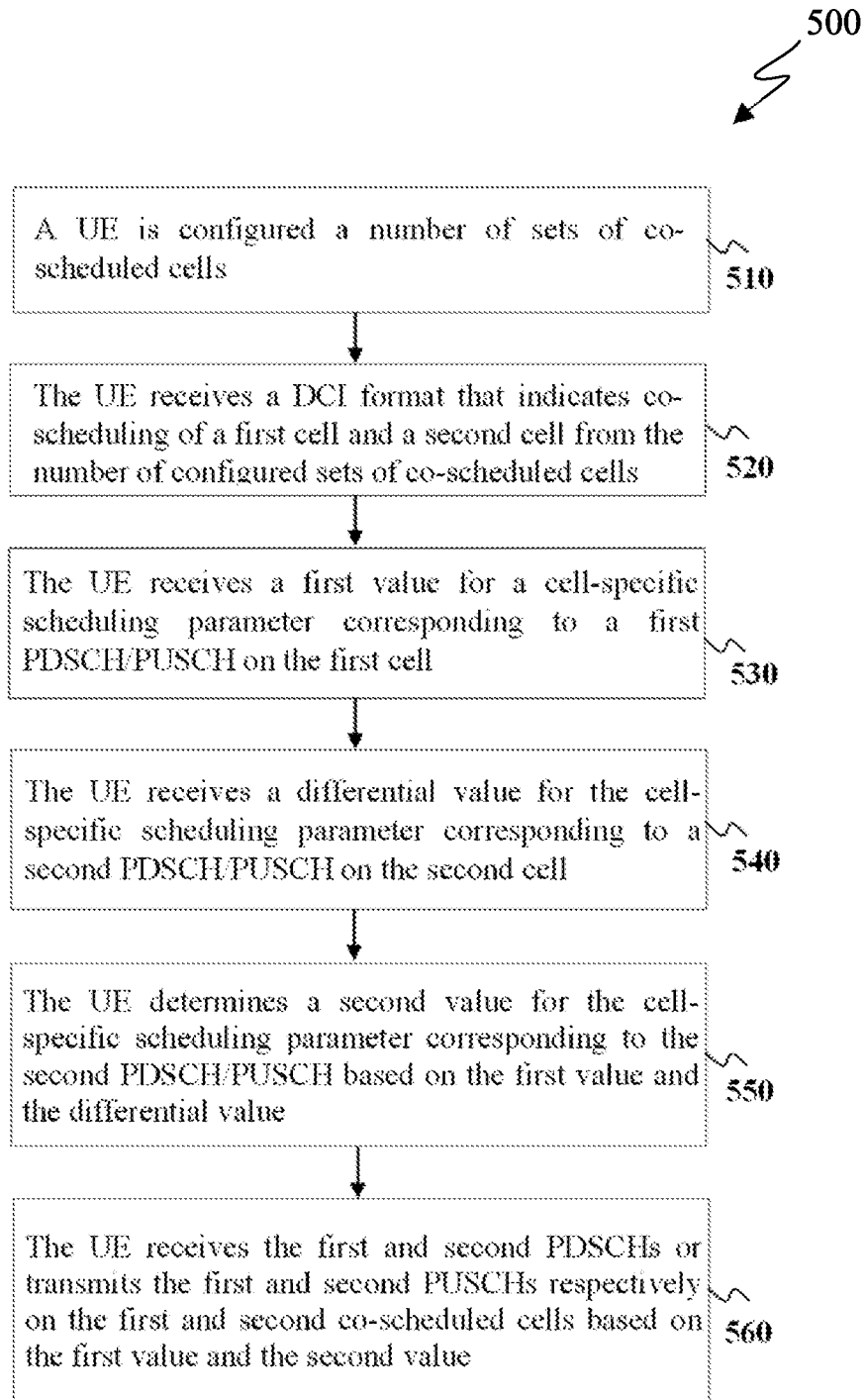
FIG. 5 illustrates a method for multi-cell scheduling based on reference and differential values for a cell-specific scheduling parameter according to embodiments of the present disclosure.

FIG. 5 illustrates a method 500 for multi-cell scheduling based on reference and differential values for a cell-specific scheduling parameter according to embodiments of the present disclosure. The embodiment of the method 500 for multi-cell scheduling based on reference and differential values for a cell-specific scheduling parameter illustrated in FIG. 5 is for illustration only. FIG. 5 does not limit the scope of this disclosure to any particular implementation of the method 500 for multi-cell scheduling based on reference and differential values for a cell-specific scheduling parameter.

As illustrated in FIG. 5, the method 500 begins at step 510, where a UE (such as the UE 116) is configured a number of sets of co-scheduled cells. At step 520, the UE receives an indication for co-scheduling a first cell and a second cell from the number of configured sets of co-scheduled cells. At step 530, the UE receives a multi-cell scheduling DCI format that provides a first value for the cell-specific scheduling parameter corresponding to a first PDSCH/PUSCH on the first cell. At step 540, the UE receives a differential value for the cell-specific scheduling parameter corresponding to a second PDSCH/PUSCH on the second cell from the DCI format or by higher layer signaling. At step 550, the UE determines a second value for the cell-specific scheduling parameter corresponding to the second PDSCH/PUSCH on the second cell, based on the first value and the differential value. At step 560, the UE receives the first and second PDSCHs or transmits the first and second PUSCHs respectively on the first and second co-scheduled cells based on the first value and the second value.

The following consider various scheduling information parameters corresponding to DCI formats described in TS 38.212.

In a first example, a link direction parameter (uplink or downlink) can be a cell-common scheduling parameter. For example, a UE can be scheduled for reception of multiple PDSCHs on a set of co-scheduled cells, or the UE can be scheduled for transmissions of multiple PUSCHs on the set of co-scheduled cells. Accordingly, the UE can be provided a cell-common value by a flag in the DCI format, such as a 0 for UL and a 1 for DL, for all co-scheduled cells.

In one example, multi-cell scheduling can include a mixture of PDSCH receptions and PUSCH transmissions. Then, link direction can be a cell-specific scheduling parameter that is separately provided for each of the co-scheduled cells. In one example, the co-scheduled cells can be grouped based on a link direction, so that the UE receives first PDSCHs on a first group of co-scheduled cells and transmits second PUSCHs on a second group of co-scheduled cells. In such case, the UE can be provided an indication that the DCI format schedules both PDSCH receptions and PUSCH transmissions, for example by a corresponding field in the DCI format, or by a corresponding C-RNTI. The number of cells with scheduled PDSCH receptions or scheduled PUSCH transmissions can be predetermined/configured or can be indicated by a corresponding field in the DCI format so that a UE can interpret other fields in the DCI format accordingly.

In one example, a carrier indicator field (CIF) can indicate a subset of co-scheduled cells from a set of co-scheduled cells, wherein a mapping between values of the CIF and subsets of co-scheduled cells is configured by UE-specific RRC signaling. One value of the CIF can correspond to all cells from the set of co-scheduled cells. For example, a first CIF value can correspond to a first set of co-scheduled cells, and a second CIF value can correspond to a second set of co-scheduled cells. The indication can be by an index of the sub-set of co-scheduled cells or by a bitmap mapping to the sub-sets of co-scheduled cells. In another example, separate CIF values are indicated per co-scheduled cell, wherein an indication can be a cell index or a single-cell CIF index, or by a bitmap mapping to each of the co-scheduled cells. In one example, when the DCI format is applicable to all cells in the set of co-scheduled cells, the DCI format does not include a CIF.

In one example, when the UE is configured N sets (or subsets) of co-scheduled cells corresponding to a scheduling cell, a DCI format for multi-cell scheduling can include a CIF with $\lceil \log_2 N \rceil$ bits. The example can apply when the configured N sets (or subsets) of co-scheduled cells include sets (or subsets) with a single serving cell, so that single-cell scheduling is also supported, or when the UE does not expect a DCI format for multi-cell scheduling to schedule PDSCH(s) or PUSCH(s) on a single serving/scheduled cell.

In another example, a DCI format for multi-cell scheduling can include a CIF with $\lceil \log_2(N+M) \rceil$ bits when:
the UE is configured M scheduled cells and N sets (or subsets) of co-scheduled cells, wherein each set (or subset) includes at least two cells from the M scheduled cells (that is, no set/subset with a single scheduled cell), and
the DCI format for multi-cell scheduling can scheduled PDSCH(s) or PUSCH(s) on a single or multiple serving/scheduled cell(s).

In one example, a bandwidth part (BWP) indicator field can be absent in a DCI format for multi-cell scheduling. For example, BWP switching can be performed only by a DCI format scheduling a PDSCH reception or a PUSCH transmission on a single cell, or by higher layer (re-)configuration, or based on timers, and so on. Therefore, the UE receives co-scheduled PDSCHs on corresponding active DL BWPs of the corresponding co-scheduled cells, or transmits co-scheduled PUSCHs on corresponding active UL BWPs of the corresponding co-scheduled cells. In another example, BWP indicator can be a cell-common scheduling parameter. For example, the UE is provided by RRC a parameter that indicates whether a BWP ID field is absent in a multi-cell scheduling DCI (MC-DCI) format and active DL/UL BWPs of co-scheduled cells need to be used, or whether the BWP ID field is present in the MC-DCI as a cell-common field. For example, the configuration of the MC-DCI format can include a BWP ID field with size of 2 bits when the RRC parameter indicates 'BWP ID present' and not include the BWP ID field (size of 0 bits) when the RRC parameter indicates 'BWP ID absent'. For example, the RRC parameter can have a default value, such as 'BWP ID absent' and when the RRC parameter is not provided, the UE expects that the MC-DCI does not include a BWP ID field. In one example, such RRC parameter is provided independently of any certain set of co-scheduled cells and applies to all sets of co-scheduled cells. In another example, the UE is provided a separate RRC parameter for each set of co-scheduled cells and a first MC-DCI format for scheduling on a first set of co-scheduled cells with RRC parameter indicating 'BWP ID absent' does not include a BWP ID field while a second MC-DCI format for scheduling on a second set of co-scheduled cells with RRC parameter indicating 'BWP ID present' includes a BWP ID field. For example, an MC-DCI format includes a BWP ID field with a reserved value for the first set of cells/MC-DCI format, and with a valid value for the second set of cells/MC-DCI format. In another example, one of the two options is defined in the specifications and an RRC parameter is not used.

In one example, a frequency-domain resource allocation (FDRA) field or a time-domain resource allocation (TDRA) can be cell-common scheduling parameters. This can be applicable, for example, for intra-band CA with co-scheduled cells that have a same SCS configuration. In one example, the UE applies the FDRA or TDRA field based on the corresponding configuration for the corresponding co-scheduled cells. For example, when the cell-common TDRA field indicates index 3, the UE receives a first PDSCH (or transmits a first PUSCH) according to parameters provided in row 3 of a first TDRA table configured for the first co-scheduled cell, and receives a second PDSCH (or transmits a second PUSCH) according to parameters provided in row 3 of a second TDRA table configured for the second co-scheduled cell.

In one example, the UE can be configured a higher layer parameter that indicates whether or not the UE applies FDRA or TDRA in cell-common manner. In another example, the UE can implicitly determine whether FDRA or TDRA are cell-common based on whether a multi-cell scheduling DCI format indicates a single FDRA/TDRA field or multiple separate FDRA/TDRA fields. In yet another example, the UE determines whether FDRA or TDRA are cell-common when the UE is not provided cell-specific FDRA or TDRA configurations, or joint FDRA or TDRA configuration (as described in the following) for the serving cells that are included in a set of co-scheduled cells.

In one example, FDRA can be cell-common by specifications for system operations and in such case the FDRA indicated in the multi-cell scheduling DCI format is the FDRA corresponding to the scheduling cell, when applicable, or corresponding to a co-scheduled cell with the smallest index or smallest CIF or with smallest SCS configuration or some other predetermined or configured co-scheduled cell. In one example, FDRA per cell may still be provided to allow for single-cell scheduling.

In one example, the UE can be provided a first FDRA/TDRA value for a first cell from the set/subset of co-scheduled cells and a differential FRDA/TDRA value for a second cell from the set/subset of co-scheduled cells. The differential FDRA/TDRA value is an offset value relative to the first FDRA/TDRA value. The UE can determine a second FDRA/TDRA for the second cell based on the first FDRA/TDRA value and the offset value. A number of bits that provide the first FDRA/TDRA value or the differential FDRA/TDRA value can be predetermined for the DCI format or can be provided by higher layer signaling for the DCI format.

In one example, the UE expects that a same resource allocation type, such as FDRA Type-1 (consecutive RBs) or FRDA Type-0 (RBG based allocation) applies to all co-scheduled cells. Similarly, the UE expects that a TDRA PDSCH/PUSCH mapping type, such as Type-A or Type-B, applies to all co-scheduled cells. In another example, the UE can be configured by higher layers a FDRA or TDRA type separately for each cell from the set of co-scheduled cells.

In one example, the UE can be provided a same FDRA type configuration for both single-cell scheduling and multi-cell scheduling, including a configuration of dynamic switching between FDRA Type-0 and Type-1. For example, the UE can be configured with dynamic switching between FDRA Type-0 and Type-1 (respectively, only FDRA Type-0 or only FDRA Type-1) for multi-cell scheduling when the UE is configured with dynamic switching between FDRA Type-0 and Type-1 (respectively, only FDRA Type-0 or only FDRA Type-1) for single-cell scheduling for all serving cells from a set of co-scheduled cells. For example, the UE does not expect to be configured with dynamic switching between FDRA Type-0 and Type-1 when the UE is provided only FDRA Type-0 or only FDRA Type-1 for at least one cell from the set of co-scheduled cells.

In one example, the UE determines an FDRA type for multi-cell scheduling based on FDRA type configuration for single-cell scheduling. For example, when all serving cells from a set of co-scheduled cells are configured with only FDRA Type-0 (respectively, only Type-1) for single-cell scheduling, the UE determines FDRA Type-0 (respectively, Type-1) for multi-cell scheduling for the set of co-scheduled cells. For example, when all serving cells from a set of co-scheduled cells are configured with dynamic switching between FDRA Type-0 and Type-1 for single-cell scheduling, the UE determines that dynamic switching between FDRA Type-0 and Type-1 applies to multi-cell scheduling for the set of co-scheduled cells.

In one example, the specifications for system operation can provide restrictions for FDRA type for multi-cell scheduling. For example, the UE expects that the UE cannot be configured with dynamic switching between FDRA Type-0 and FDRA Type-1 when operating with multi-cell scheduling of PDSCHs/PUSCHs. For example, that can be further conditioned on the UE not supporting such dynamic switching on at least one cell from the co-scheduled cells. It is noted that, the UE can be still configured for such dynamic switching when operating with single-cell scheduling of PDSCH/PUSCH.

In one example, the UE is provided a same RBG size for all co-scheduled cells. In one example, the UE does not expect to be configured different SCS configuration for a set of co-scheduled cells. In another example, the UE does not expect to receive a multi-cell scheduling DCI format when active BWPs of the set of co-scheduled cells have different SCS configurations.

In one example, the UE can be provided separate FDRA types for single-cell scheduling and multi-cell scheduling. For example, the UE can be configured an FDRA type for multi-cell scheduling regardless of respective FDRA types for single-cell scheduling on serving cells of a set of co-scheduled cells. For example, the UE can be provided with FDRA type-0 (respectively, FDRA Type-1) for multi-cell scheduling when at least one serving cell from the set of co-scheduled cells is configured with FDRA type-1 (respectively, FDRA Type-0). For example, the UE can be configured with dynamic switching between FDRA Type-0 and Type-1 when at least one serving cell from the set of co-scheduled cells is configured with only FDRA Type-0 or only FDRA Type-1.

In one example, a UE considers FDRA configurations to be incompatible for single-cell scheduling and multi-cell scheduling for at least one serving cell from a set of co-scheduled cells when the UE is configured:

FDRA Type-0 for multi-cell scheduling when at least one serving cell from the set of co-scheduled cells is configured with FDRA Type-1, or FDRA Type-1 for multi-cell scheduling when at least one serving cell from the set of co-scheduled cells is configured with FDRA Type-0, or dynamic switching between FDRA Type-0 and Type-1 when at least one serving cell from the set of co-scheduled cells is configured with only FDRA Type-0 or only FDRA Type-1.

In one example, the UE does not expect to be provided incompatible FDRA configurations for single-cell scheduling and multi-cell scheduling for any serving cell from a set of co-scheduled cells.

In another example, when the UE is provided incompatible FDRA configurations for single-cell scheduling and multi-cell scheduling for at least one serving cell from a set of co-scheduled cells, the UE interprets an FDRA field in a multi-cell scheduling DCI format:

in a first option, based on an FDRA configuration provided for single-cell scheduling (that is, the UE discards the FDRA configuration for multi-cell scheduling for the at least one serving cell), or in a second option, based on an FDRA configuration provided for multi-cell scheduling, along with an assumption of predetermined/default value(s) for any parameter that is missing (such as RBG size, as discussed below) in the cell-specific FDRA configuration for single-cell scheduling.

For example, if the UE is configured:

FDRA Type-0 only or dynamic switching between FDRA Type-0 and Type-1 for multi-cell scheduling on a set of co-scheduled cells, and FDRA Type-1 only for single-cell scheduling for at least one serving cell from the set of serving cells (therefore, has no dedicated/cell-specific configuration for the RBG size for the at least one serving cell), the UE determines a (nominal or actual) RBG size for the at least one serving cell, in a first option, based on a default/predetermined configuration for the nominal RBG size parameter, such as Configuration 1 in [TS 38.214 v17.1.0]. In a second option, the UE expects to be provided a configuration for the nominal RBG size parameter (for example, as an IE with the FDRA type configuration for multi-cell scheduling) that the UE can apply commonly for the at least one serving cell without cell-specific RBG size configuration.

In one example, when the UE is configured with dynamic switching between FDRA Type-0 and FDRA Type-1, the UE expects that a multi-cell scheduling DCI format indicates a single cell-common indication of the FDRA type, either as FDRA Type-0 or Type-1, for co-scheduled PDSCHs/PUSCHs on a set of co-scheduled cells.

In one example, when the UE is provided with active BWPs on a set of co-scheduled that have different sizes (in terms of the number of RBs), the UE determines a number of bits for the FDRA field in a multi-cell scheduling DCI format based on a size of a largest corresponding size among the set of co-scheduled cells. Accordingly, the UE determines an FDRA for each PDSCH/PUSCH from the co-scheduled PDSCHs/PUSCHs based on a number of least significant bits (LSB s) from the FDRA field of the multi-cell scheduling DCI format, wherein the number of bits is equal to a cell-specific bit-width of the FDRA field, assuming the FRDA type configured/determined for multi-cell scheduling.

For example, when $N_{RB}^{DL,BWP,c}$ is a size of the active DL bandwidth part of a serving cell c from a set S of co-scheduled cells, an FDRA field in the DCI format for multi-cell scheduling of multiple PDSCHs on the set S of co-scheduled cells includes:

$$\max_{c \in S} N_{RBG,c}$$

bits if only resource allocation type 0 is configured/determined for multi cell scheduling of the set co-scheduled cells, where $N_{RBG,c}$ is a total number of RBGs for an active downlink bandwidth part of the serving cell c, as defined in [TS38.214], When a UE is not provided a cell-specific configuration for $N_{RBG}$ for single-cell scheduling, the UE determines $N_{RBG,c}$ as previously described;

The UE determines an FDRA for a PDSCH from co-scheduled PDSCHs on the serving cell c based on the $N_{RBG,c}$ LSBs of the FDRA field in the multi-cell scheduling DCI formats.

$$\max_{c \in S} \lceil \log_2(N_{RB}^{DL,BWP,c}(N_{RB}^{DL,BWP,c}+1)/2) \rceil \text{ bits}$$

if only resource allocation type 1 is configured/determined for multi-cell scheduling of the set of co-scheduled cells, The UE determines an FDRA for a PDSCH from co-scheduled PDSCHs on the serving cell c based on the $\lceil \log_2(N_{RB}^{DL,BWP,c}(N_{RG}^{DL,BWP,c}+1)/2) \rceil$ LSBs of the FDRA field in the multi-cell scheduling DCI formats; or $$\max_{c \in S} \max(\lceil \log_2(N_{RB}^{DL,BWP,c}(N_{RB}^{DL,BWP,c}+1)/2) \rceil, N_{RBG,c}) + 1 \text{ bits}$$

if dynamic switching is determined between FDRA Type-0 and Type-1 is configured/determined for multi-cell scheduling of the set of co-scheduled cells.

When a UE is not provided a cell-specific configuration for $N_{RBG}$ for single-cell scheduling, the UE determines $N_{RBG,c}$ as previously described;

The most significant bit (MSB) is used to indicate resource allocation Type 0 or resource allocation Type 1 for co-scheduled PDSCHs on all serving cells from the set of co-scheduled cells, where the bit value of 0 indicates resource allocation Type 0 and the bit value of 1 indicates resource allocation Type 1.

For FDRA resource allocation Type 0, the UE determines an FDRA for a PDSCH from co-scheduled PDSCHs on the serving cell c based on the $N_{RBG,c}$ LSBs of the FDRA field in the multi-cell scheduling DCI formats.

For FDRA resource allocation Type 1, the UE determines an FDRA for a PDSCH from co-scheduled PDSCHs on the serving cell c based on the $\lceil \log_2(NR_{RB}^{DL,BWP,c}(N_{RB}^{DL,BWP,c}+1)/2) \rceil$ LSBs of the FDRA field in the multi-cell scheduling DCI formats.

When frequency hopping (FH) for PUSCH receptions is not configured or is disabled for a set of co-scheduled cells, as is subsequently described, the FDRA field is same as described above for co-scheduled PDSCHs, except that $N_{RB}^{DL,BWP,c}$ is replaced by $N_{RB}^{UL,BWP,c}$, and "DL"/"downlink" and "PDSCH(s)" are replaced by "UL"/"uplink" and "PUSCH(s)", respectively.

In one example, a FH flag can be a cell-common field. For example, a UE expects to be configured with FH for cells in a set of co-scheduled cells. For example, when the UE is configured with FH for PUSCH transmissions for at least a first cell from a set of co-scheduled cells, and is not configured with FH for PUSCH transmissions for at least a second cell from the set of co-scheduled cells, FH operation can be disabled for the co-scheduled PUSCHs on the set of co-scheduled cells. Accordingly, the UE does not expect to be provided a FH flag in a DCI format for multi-cell scheduling for the set of co-scheduled cells, or the UE does not perform FH for the co-scheduled PUSCHs on the set of co-scheduled cells, including for a co-scheduled PUSCH on the first cell.

In another example, the UE can be configured a FH flag in a DCI format for multi-cell scheduling for when at least one cell from a set of co-scheduled cells is provided FH configuration for PUSCH transmissions. For example, the UE determines that FH is enabled for PUSCH transmissions on first serving cells from the set of co-scheduled cells that are configured FH operation, and ignores the FH flag for PUSCH transmissions on second serving cells from the set of co-scheduled cells that are not configured FH operation.

For example, the UE is expected to be provided a same configuration for FH parameter(s) for cells in a set of co-scheduled cells, such as a same configuration for a number of offsets values provided by higher layer parameter frequencyHoppingOffsetLists. In one example, the UE does not expect to be configured a set of co-scheduled cells including a first cell that is provided two offset values by the higher layer parameter frequencyHoppingOffsetLists, and a second cell that is provided four offset values by the higher layer parameter frequencyHoppingOffsetLists.

In another example, when first and second cells from a set of co-scheduled cells are provided different number of offset values by the higher layer parameter frequencyHoppingOffsetLists, such as 2 offset value for the first cell and 4 offset values for the second cell, in one option, the UE determines the FH pattern for the first and second cells based on different number of bits from the FDRA field in the DCI format for multi-cell scheduling. For example, the DCI format can use 2 bits from the FDRA field for FH indication, wherein the MSB (or LSB) of those 2 bits is used for the FH indication of the first cell, and both of the 2 bits are used for the FH indication of the second cell.

In another option, the DCI format will include only 1 bit from the FDRA field for FH indication, and the UE determines the FH pattern for both the first and the second cells based on that bit. Accordingly, the UE uses only two of the 4 configured offset values for the second cell, such as only the first two offset values, in the case of multi-cell scheduling of PUSCHs, and discards the other two offset values. It is noted that, the UE can operate with any of the four configured offset values when a PUSCH on the second cell is scheduled by a single-cell scheduling DCI format.

For example, when the UE is configured FH for a set of co-scheduled cells and/or the UE determines to operate with FH, as described above, and when $N_{RB}^{UL,BWP,c}$ is a size of the active UL bandwidth part of a serving cell c from a set S of co-scheduled cells, an FDRA field in the DCI format for multi-cell scheduling of multiple PUSCHs on the set S of co-scheduled cells includes:

$$\max_{c \in S} N_{RBG,c}$$

bits if only resource allocation Type 0 is configured/determined for multi-cell scheduling of the set co-scheduled cells, where $N_{RBG,c}$ is a total number of RBGs for an active uplink bandwidth part of the serving cell c, as defined in [TS38.214], When a UE is not provided a cell-specific configuration for $N_{RBG}$ for single-cell scheduling, the UE determines $N_{RBG,c}$ as discussed earlier;

The UE determines an FDRA for a PUSCH from co-scheduled PUSCHs on the serving cell c based on the $N_{RBG,c}$ LSBs of the FDRA field in the multi-cell scheduling DCI formats.

$$\max_{c \in S} \lceil \log_2(N_{RB}^{UL,BWP,c}(N_{RB}^{UL,BWP,c}+1)/2) \rceil \text{ bits}$$

if only resource allocation Type 1 is configured/determined for multi-cell scheduling of the set of co-scheduled cells, The UE determines $N_{UL\_hop}$ MSBs for FH indication:
- $N_{UL\_hop}=1$ bit when all cells in the set S of co-scheduled cells are configured two offset values by the higher layer parameter frequencyHoppingOffsetLists, or when at least one cell from the set S of co-scheduled cells is configured two offset values and the UE expects a same number of FH indication bits for a set of co-scheduled cells per the specifications for system operation, as described above. When the UE is configured four offset values for the cell c, the UE determines the FH pattern for the co-scheduled PUSCH on the cell c from the first two configured offset values;
- $N_{UL\_hop}=2$ bits when at least one cell in the set S of co-scheduled cells is configured four offset values by the higher layer parameter frequencyHoppingOffsetLists. When the UE is configured two offset values for the cell c, the UE determines the FH pattern for the co-scheduled PUSCH on the cell c from the MSB of the FDRA field (and ignores the MSB bit for cell c);

The UE determines an FDRA (within the hop) for a PUSCH from co-scheduled PUSCHs on the serving cell c based on the $\lceil \log_2(N_{RB}^{UL,BWP,c}(N_{RB}^{UL,BWP,c}+1)/2) \rceil$ $N_{UL\_hop}$ LSBs of the FDRA field in the multi-cell scheduling DCI formats; or $$\max_{c \in S} \max(\lceil \log_2(N_{RB}^{UL,BWP,c}(N_{RB}^{UL,BWP,c}+1)/2) \rceil, N_{RBG,c}) + 1 \text{ bits}$$

if dynamic switching is determined between FDRA Type-0 and Type-1 is configured/determined for multi-cell scheduling of the set of co-scheduled cells.

When a UE is not provided a cell-specific configuration for $N_{RBG}$ for single-cell scheduling, the UE determines $N_{RBG,c}$ as discussed earlier;

The MSB bit is used to indicate resource allocation type 0 or resource allocation type 1 for co-scheduled PUSCHs on all serving cells from the set of co-scheduled cells, where the bit value of 0 indicates resource allocation type 0 and the bit value of 1 indicates resource allocation type 1.

For FDRA resource allocation type 0, the UE determines an FDRA for a PUSCH from co-scheduled PUSCHs on the serving cell c based on the $N_{RBG,c}$ LSBs of the FDRA field in the multi-cell scheduling DCI formats.

For FDRA resource allocation type 1, the UE determines $N_{UL\_hop}$ MSBs for FH indication, as described above, and an FDRA (within the hop) for a PUSCH from co-scheduled PUSCHs on the serving cell c based on the $\lceil \log_2(N_{RB}^{UL,BWP,c}(N_{RB}^{UL,BWP,c}+1)/2) \rceil - N_{UL\_hop}$ LSBs of the FDRA field in the multi-cell scheduling DCI formats.

In one realization, the UE can replace $$\max_{c \in S} \ldots$$

with $$\max_{c \in \cup S} \ldots,$$

for determining the FDRA field for co-scheduled PDSCHs/PUSCHs, wherein ∪S, in one option, can be a union over all sets of co-scheduled cells corresponding to a same scheduling cell. In another option, ∪S can be a union over all sets of co-scheduled cells configured for the UE (corresponding to same or different scheduling cell(s)).

In one example, the UE is provided a joint TDRA table across serving cells from a set of co-scheduled cells. Herein, a joint TDRA table can refer to a TDRA table that includes multiple parameter sets, such as multiple columns or multiple sets of columns, corresponding to multiple co-scheduled cells. For example, each parameter set/column/set of columns provides a set of time-domain parameters (such as SLIV, mapping type, K0 or K2, number of repetitions, and so on) for a corresponding co-scheduled cell. For example, each row of the joint TDRA table indicates a first time-domain parameter set for a first co-scheduled cell, and a second time-domain parameter set for a second co-scheduled cell. Accordingly, when the UE detects a multi-cell scheduling DCI format for a set of co-scheduled cells, the TDRA field in the DCI format indicates an index of a row of the joint TDRA table, which in turn, indicates multiple TDRA values for the multiple corresponding co-scheduled cells. This method is an example of a multi-cell mapping method considered herein.

In one example, a joint TDRA table can provide multiple values for first TDRA parameters that are cell-specific, and a single value for second parameters that are cell-common. For example, a joint TDRA table for multi-cell scheduling can include multiple SLIVs corresponding to the multiple serving cells from a set of co-scheduled cells, and include a single TDRA mapping type or a single PDSCH/PUSCH slot scheduling offset value K0/K2 that applies to all serving cells from the set of co-scheduled cells. For example, the UE expects a same TDRA mapping type for serving cells of a set of co-scheduled cells. For example, the UE expects a single K0 or a single K2 for co-scheduled PDSCHs or PUSCHs on a set of co-scheduled cells, for example, when the co-scheduled PDSCHs or PUSCHs have a same SCS configuration.

In one example, a joint TDRA table for multi-cell scheduling can include multiple SLIVs and multiple K0/K2 values corresponding to the multiple serving cells from a set of co-scheduled cells, and include a single TDRA mapping type. Such configuration can be beneficial, for example, when the UE is provided different SCS configurations for different serving cells from the set of co-scheduled cells.

In one example, the UE can be a configured a joint TDRA table for a set of co-scheduled cells with:
 at least one entry/row for which multiple TDRA parameter sets, such as multiple SLIV values, are provided, and
 some entries/rows for which one set of TDRA parameters, such as one SLIV, one K0/K2 parameter, and so on, is provided.

When a DCI format for multi-cell scheduling indicates an entry/row of the joint TDRA table that includes only one TDRA parameter set, such as one SLIV, K0/K2, and so on, the UE applies the provided TDRA parameter set to all co-scheduled PDSCHs or PUSCHs on the set of co-scheduled cells.

When a DCI format for multi-cell scheduling indicates an entry/row of the joint TDRA table that includes multiple TDRA parameter sets, such as multiple SLIVs, the UE applies each of the multiple provided TDRA parameter sets to a corresponding co-scheduled PDSCHs or PUSCHs on the set of co-scheduled cells, for example, a first SLIV for a first co-scheduled PSDCH/PUSCH, a second SLIV for a second co-scheduled PDSCH/PUSCH, and so on.

In one example, the UE can be configured a same joint TDRA table for both co-scheduled PDSCHs and co-scheduled PUSCHs on a set of co-scheduled cells. For example, the joint TDRA table can include both K0 and K2 values, and the UE applies the provided K0, or K2 value depending on whether the multi-cell scheduling is for a PDSCH reception or for a PUSCH transmission, respectively.

In another example, the UE can be provided different joint TDRA tables for co-scheduled PDSCHs and co-scheduled PUSCHs on a same set of co-scheduled cells. For example, the UE can be provided a first TDRA table for co-scheduled PDSCHs on a set of co-scheduled cells, and a second joint TDRA table for co-scheduled PUSCHs on the set of co-scheduled cells.

In one example, the UE can be provided a joint TDRA table for each configured set of co-scheduled cells. For example, the UE can be provided a first joint TDRA table for a first set of co-scheduled cells, and a second joint TDRA table for a second set of co-scheduled cells. In one example, configuration of multiple joint TDRA tables is supported regardless of whether the first set of co-scheduled cells and the second set of co-scheduled cells share a same serving cell (that is, whether or not a first serving cell belongs to both the first set and the second set). In another example, configuration of multiple joint TDRA tables is supported only when the first set and the second set do not share any serving cell (that is, when there is no serving cell that belongs to both the first and the second sets). In yet another example, when a first set of co-scheduled cells and a second set of co-scheduled cells share a serving cell (that is, there is at least one serving cell that belongs to both the first and the second sets), the UE can be configured with a single/shared joint TDRA table that corresponds to the union of the first and second sets of co-scheduled cells. Accordingly, when the UE detects a DCI format for multi-cell scheduling of the first set of co-scheduled cells, the TDRA field in the DCI format indicates an index of a row of the single/shared joint TDRA table, which in turn, indicates multiple TDRA values for the multiple corresponding cells included in the first set of co-scheduled cells. In this example, the UE discards the TDRA indicated by the single/shared joint TDRA table for other serving cells that are not included in the first set of co-scheduled cells and belong only to the second set of co-scheduled cells.

In one example, when the UE can be configured a value for the time-domain higher layer parameter, such as PDSCH-TimeDomainResourceAllocationList or PUSCH-TimeDomainResourceAllocationList (or multi-cell variants thereof), that indicates no joint TDRA table is configured for the multi-cell scheduling operation, in one option, the UE uses cell-specific TDRA tables. In a second option, the UE uses default TDRA tables that are provided in the specifications for system operation, such as those in [TS 38.214 v17.1.0] for single-cell operation, and applies the table entries for each/all co-scheduled cells. In another example, the specifications for system operation provide new multi-cell default TDRA tables based on a number of co-scheduled cells (for example, a first default table for two co-scheduled cells, a second default table for three co-scheduled cells, and so on), and the UE applies the TDRA table entries based on an ordering of co-scheduled cells, as described in various examples of the present disclosure, such as based on ascending (or descending) order of cell index or cell-specific CIF.

In one example, when the UE is configured a first SCS for an active BWP of a first co-scheduled cell and a second SCS for an active BWP of a second co-scheduled cell, the UE receives first and second PDSCHs or transmits first and second PUSCHs by interpreting the TDRA/FDRA field of the multi-cell scheduling DCI format:
 in one option: for the first co-scheduled cell based on the first SCS configuration, and for the second co-scheduled cell based on the second SCS configuration;
 in a second option: for all serving cells included in the set of co-scheduled cells based on a smallest SCS configuration among the first and second SCS configurations (in general, based on a smallest SCS configuration among the SCS configurations for the serving cells included in the set of co-scheduled cells);
 in a third option: for all serving cells included in the set of co-scheduled cells based on a largest SCS configuration among the first and second SCS configurations (in general, based on a largest SCS configuration among the SCS configurations for the serving cells included in the set of co-scheduled cells).

In one example, multi-cell scheduling is supported only for a set of co-scheduled cells that has a same SCS on the respective active DL/UL BWPs.

In one example, multi-cell scheduling is restricted to a set of co-scheduled cells that operates with a same TDD configuration.

In one example, other scheduling parameters related to resource allocation, such as VRB-to-PRB mapping, PRB bundling, rate matching, and ZP CSI-RS trigger, can follow higher layer configuration, or can be provided as a cell-common scheduling parameter for all co-scheduled cells. For example, VRB-to-PRB mapping can be cell-common, such as when the set of co-scheduled cells are within the intra-band CA setting. In one example, some or all of those scheduling parameters can be absent in a DCI format for multi-cell scheduling and be provided to the UE by higher layer signaling, commonly or separately for each cell from the set of co-scheduled cells. In another example, per specifications for system operation, some parameters can be disabled (are not applicable) for multi-cell scheduling operation, such as an absence of VRB-to-PRB mapping, or of PRB bundling, or of ZP CSI-RS trigger.

In one example, a modulation and coding scheme (MCS) parameter can be cell-common for a set of co-scheduled cells or can be provided by differential indication. In one example, the DCI format can provide a single MCS value that is applied to the set of co-scheduled cells, for example, for the case of intra-band CA operation. In another example, the DCI format can provide a first MCS for a first cell from the co-scheduled cells and a differential MCS value for remaining cells of the co-scheduled cells. The UE can determine a second MCS value for a second cell from the co-scheduled cells by adding the differential value to the first value.

In one example, the DCI format provides a new data indicator (NDI) parameter and a redundancy version (RV) parameter separately for each co-scheduled cell. In one example, the UE can be configured to operate with a restricted subset of RVs for multi-cell scheduling. For example, the UE can be configured two RV values, such as RV=0 or RV=2 (alternatively, RV=0 or RV=3) instead of the four RV values used in a single-cell scheduling DCI format, therefore only one bit is sufficient to indicate an RV for each serving cell. For example, for a set of co-scheduled cells comprising N serving cells, the UE can be configured N bits for the RV DCI field in the corresponding multi-cell scheduling DCI format. In another example, per specifications for system operation, the UE expects that only new/initial transmissions of a TB are supported for multi-cell scheduling. In such a case, the UE does not expect an indication for NDI or for RV since all PDSCHs/PUSCHs on co-scheduled cells will correspond to toggled NDI values or to an RV value of zero. The restriction can be applicable to all HARQ processes or to a subset of the HARQ processes. The subset of HARQ processes can be configured by higher layers.

In one example, the UE can receive a cell-common NDI value, such as an indication for all toggled, that is applied to co-scheduled cells.

In one example, HARQ process number (HPN) is a cell-specific parameter that is provided separately for each co-scheduled PDSCH/PUSCH by a multi-cell scheduling DCI format.

In one example, the UE can operate with a sub-set of HARQ processes for each (BWP of a) serving cell for multi-cell scheduling, compared to single-cell scheduling. Therefore, a reduced number of bits can be used to indicate HPN in the DCI format for multi-cell scheduling. For example, the UE only operates with N=4 or 8 HARQ processes per (BWP of a) serving cell for multi-cell processing, instead of 16 or 32 HARQ processes that the UE operates with for single-cell scheduling, therefore only 2 or 3 bits per co-scheduled cell is sufficient for the HPN field. For example, the UE can operate with only the first N=4 or 8 HARQ processes for each (BWP of a) serving cell from the set of co-scheduled cells. In another example, higher layer configuration provides the IDs for the HARQ processes for each (BWP of a) serving cell that the UE operates with for multi-cell scheduling. Accordingly, the HARQ process number (HPN) field in a DCI format for multi-cell scheduling on the set of co-scheduled cells provides codepoints to the IDs of the sub-selected set of N=4 or 8 HARQ processes. For example, codepoint '000' (or '00') for the HPN field of a co-scheduled cell corresponds to the first sub-selected HARQ process provided by higher layers (or simply the first HARQ process) for the co-scheduled cell, codepoint '001' (or '01') corresponds to the second sub-selected HARQ process provided by higher layers (or simply the second HARQ process) for the co-scheduled cell, and so on. It is noted that, HPN is a cell-specific field in the DCI format that is indicated separately for each of the co-scheduled cells, but with a reduced number of bits.

In one example, selection of the sub-set of HARQ processes for multi-cell scheduling can be provided by a MAC-CE command and the codepoints of the DCI format correspond to the HARQ processes provided by the MAC-CE command. In one example, a single MAC-CE command can provide HARQ processes for multiple serving cells, such as a set of co-scheduled cells.

In one example, the UE does not expect to be configured a multi-cell scheduling DCI format that includes scheduling information (such as one or more of MCS, NDI, RV, and so on) for a second transport block/codeword. Therefore, all co-scheduled PDSCHs/PUSCHs include only one transport block/codeword. In another example, a multi-cell scheduling DCI format can include information of a second transport block/codeword for one or more of the co-scheduled PDSCHs/PUSCHs, wherein such information can be cell-specific. For example, such information can be included in the DCI format or can be provided by auxiliary methods, such as an additional PDSCH or PDCCH that can include part of the scheduling information for the co-scheduled cells, such as one or more of cell-specific DCI fields. The UE determines whether a second transport block/codeword can/may be present for a PDSCH/PUSCH from the co-scheduled PDSCHs/PUSCHs based on a higher layer configuration, such as by the maxNrofCodeWordsScheduledByDCI parameter for the corresponding serving cell. For example, when a UE is indicated by higher layers a set of co-scheduled cells with N cells and receptions on the set of the N cells that can include a maximum number of M TBs across the N cells, with M>N, the UE expects to receive an MC-DCI format that includes (at least) M values for some (cell-specific) fields, such as one or more of the NDI, HPN, RV, MCS, and so on, fields. For example, when a set of co-scheduled cells includes a first cell where a PDSCH reception can include up to two TBs, a second cell where a PDSCH reception can include only one TB, and a third cell where a PDSCH reception can include up to two TBs, the UE expects to receive (at least) 2+1+2=5 values for the aforementioned fields. In one example, the UE expects to receive an MC-DCI format with $M_{max}$ values for some (cell-specific) fields, such as one or more of more of NDI, HPN, RV, MCS, and so on, fields where $M_{max}$ is a maximum, over all configured sets of co-scheduled cells, number of TBs that can be received across a set of co-scheduled cells. That is, when $N_i$ denotes a number of TBs that can be provided by PDSCH receptions on cells from a set of co-scheduled cells and the UE is configured S sets of co-scheduled cells, the UE determines $$M_{max} = \max_{Sets\{1,\ldots,S\}} \sum_{i \in \text{Set } i} N_i.$$

Alternatively, $M_{max}=M_{max,1}+M_{max,2}$, where $M_{max,1}$ is a size of a largest set of co-scheduled cells, that is a set of co-scheduled cells that includes the largest number of cells, and $M_{max,2}$ is a largest number of cells, from the S sets of co-scheduled cells, where corresponding PDSCH receptions can include up to two TBs. For example, if co-scheduling can be for cells {1, 2, 3, 4}, {5, 6, 7, 8}, {1, 2, 5, 6} and {3, 4, 7, 8} and a PDSCH reception with up to two TBs can be only on cell 1 and cell 2, the MC-DCI format can be dimensioned based on two cells where corresponding PDSCH receptions can be with up to two TBs and 2 cells where corresponding PDSCH receptions can be only with one TB. In one example, when an MC-DCI format can schedule PDSCH receptions providing a total of M TBs, where M<$M_{max}$, the MC-DCI format can include ($M_{max}$−M) reserved values for a field that are appended to M valid values for the field. Accordingly, the UE can determine a bit-width for the field, based on a maximum number of bits needed for the field across different combinations of co-scheduled cells, and the UE can determine a bit-width for each value corresponding to each scheduled cell based on a corresponding configuration for the cell. In one example, when a UE is configured two TBs per PDSCH for a cell from the cells that are co-scheduled by a multi-cell scheduling DCI format, the two values, for a cell-specific parameter, corresponding to the two TBs can be adjacent in the DCI format, regardless of whether the DCI format schedules one TB or two TBs for the PDSCH on the cell. For example, when the DCI format schedules only one TB for the PDSCH on the cell, the DCI format includes a first MCS/NDI/HPN/RV value for the first TB, and the UE includes a second MCS/NDI/HPN/RV value for the second TB that are set to reserved values. For example, the second MCS value can indicate I_MCS=26 and the second RV value can indicate RV=1. In another example, at least some of the second MCS/NDI/HPN/RV values, such as the second HPN value or the second NDI value that are reserved can be discarded from the DCI format or can be placed as part of the padding bits similar to those for non-scheduled cells as previously described.

In one example, some HARQ-related parameters can be absent in a DCI format for multi-cell scheduling. For example, code-block group (CBG) operation is not supported for multi-cell scheduling and a UE does not expect to receive indication for codeblock group transmission indicator (CBGTI) or codeblock group flush indicator (CBGFI) parameters for the co-scheduled cells.

In one example, when a UE is configured different TDD configurations or different SCSs on respective DL BWPs of respective co-scheduled cells, and the UE is provided a cell-common PDSCH-to-HARQ_feedback timing value (K1) for multiple PDSCHs on the respective co-scheduled cells, the UE interprets the K1 value relative to a slot for PUCCH transmissions that overlaps with a slot of a latest PDSCH reception on a cell from the co-scheduled cells. For example, if the DCI format schedules two PDSCH receptions on two respective cells wherein, with reference to slots of PUCCH transmissions, the PDSCH reception on the first cell ends in slot n and the PDSCH reception on the second cell ends in slot n+1 for PUCCH transmissions, the UE interprets the K1 value relative to slot n+1.

In one example, a priority indicator can be a cell-common parameter in a DCI format for multi-cell scheduling, for example, because the UE does not expect PDSCHs with different priority levels to be co-scheduled by a same DCI format. In one example, a priority indicator can be absent in a DCI format for multi-cell scheduling. For example, the UE determines a reference/default priority level for co-scheduled PDSCHs, such as priority 0 (or priority 1), in the case of multi-cell scheduling.

In one example, some MIMO-related parameters, such as a DM-RS sequence initialization, can be absent in a DCI format for multi-cell scheduling, and are instead provided by higher layer configuration. In one example, DM-RS sequence initialization can be a cell-common field that is provided once in a DCI format for multi-cell scheduling, and whose value applies commonly to the corresponding co-scheduled PDSCHs.

In one example, some parameters can be same for single-cell and for multi-cell scheduling. For example, an SRS request field in a DCI format can be used to provide a same indication for multi-cell scheduling as for single cell scheduling on a primary cell.

In one example, a configuration of some fields that are supported in a DCI format for single-cell scheduling may not be supported in a DCI format for multi-cell scheduling, such as DCI fields related to unlicensed band operation, or UE power saving operation, and so on. For example, an indication for SCell dormancy may not be supported in a DCI format for multi-cell scheduling. For example, a DCI format for multi-cell scheduling may not include one or more of the following DCI fields: ChannelAccess-CPext, Minimum applicable scheduling offset indicator, PDCCH monitoring adaptation indication, Invalid symbol pattern indicator, Sidelink assignment index, and so on.

In one example, when none of the serving cells in the set of co-scheduled cells are configured an SUL carrier, in one option, a DCI format for multi-cell scheduling does not include an UL/SUL field. In another option, the UL/SUL indicator field is configured/present in the DCI format, but the field is reserved.

In another example, an UL/SUL indicator field may be disabled for a DCI format for multi-cell scheduling. For example, the UE does not expect an UL/SUL indicator field in a multi-cell scheduling DCI format:
  in one example, when none of the serving cells in the set of co-scheduled cells are configured an SUL carrier;
  in another example, when the UE is not configured SUL for at least one serving cell in the set of co-scheduled cells (although SUL carrier may be configured for some other serving cells in the set of co-scheduled cells), or
  in yet another example, even when the UE is configured SUL carrier for all serving cells in a set of co-scheduled cells (i.e., disabling based on the specifications for system operation).

Herein, when the field is disabled (for the UL/SUL indicator field, or in general for any DCI field), in one option, the field is not present in the DCI format for multi-cell scheduling, or in another option, the field in configured/present in the DCI format, but the field is reserved.

In one example, when the UL/SUL indicator field is disabled (that is, absent or reserved) in a DCI format for multi-cell scheduling, the UE determines an uplink carrier for a PUSCH from co-scheduled PUSCHs on a cell from a set of co-scheduled cells that is configured an SUL carrier, based on:
  an uplink carrier (UL or SUL) indicated by a last single-cell scheduling DCI that scheduled a PUSCH transmission on the cell, or
  an uplink carrier on which the UE transmitted a last PUSCH, or
  a reference uplink carrier, such as the UL carrier (or the SUL carrier), that is predetermined in the specifications for system operation or is provided by higher layer configuration.

In the examples above, the UE can determine a last DCI format or a last PUSCH based on a last/ending symbol of a latest received PDCCH or PUSCH. Herein, the symbol or slot can be with respect to the SCS configuration of the last DCI format/PDCCH or PUSCH, or SCS configuration of the co-scheduled PUSCH, or a smallest (or largest) SCS configuration among the set of co-scheduled cells, or a reference SCS configuration, and so on.

In one example, the UE determines a last DCI format/PDCCH or PUSCH considering a time offset, for example T symbols/slots, such a DCI format/PDCCH processing time or a PUSCH processing time, and so on. For example, the UE does not consider a first DCI format/PDCCH or first PUSCH when determining a last DCI format/PDCCH or PUSCH, if an ending symbol or slot of the first DCI format/PDCCH or first PUSCH is after a symbol or slot that is T symbols/slots before a starting symbol/slot of the co-scheduled PUSCH or a starting symbol/slot of the DCI format for multi-cell scheduling.

In one example, a DCI format for multi-cell scheduling can include an UL/SUL indicator field that is cell-common, so applies to all cells in a set of co-scheduled cells. In one example, when the UE receives a DCI format for multi-cell scheduling with a cell-common UL/SUL indicator field, and the UE is not configured an SUL carrier for a serving cell from the set of co-scheduled cells, the UE ignores the UL/SUL indicator field for the PUSCH transmission on the serving cell.

In one example, a DCI format for multi-cell scheduling for a set of co-scheduled cells can include an indication of a first subset of cells with PUSCH transmission on the respective UL carrier, or a second subset of cells with PUSCH transmission on the respective SUL carrier. Herein, the first and second subsets are subsets of the set of co-scheduled cells. For example, the multi-cell scheduling DCI format can include an SUL indicator field (with for example 1-3 bits) that indicates a codepoint corresponding to a subset of the set of co-scheduled cells, per higher layer configuration. Accordingly, the UE transmits PUSCH(s) on the respective SUL carrier(s) for cell(s) included in the subset that is indicated by the codepoint of the SUL indicator field are on the respective SUL carrier(s), and transmits PUSCH(s) on the respective UL carrier(s) for all remaining cell(s) from the set of co-scheduled cell that are not included in the indicated subset.

In one example, UL/SUL indication can be based on a bit-map with a number of bits equal to a number of co-scheduled cells, wherein the MSB or LSB bits of the bitmap are mapped to co-scheduled cells in a predetermined order, such as an ascending order of (individual/cell-specific) CIF values or ascending order of cell indexes, and so on.

In one example, a CSI request field is provided only once in a multi-cell scheduling DCI format for co-scheduled PUSCH(s), with a same bit-width as in [TS 38.212 v16.8.0], wherein the UE procedures is as follows. In one example, CSI is multiplexed on only one PUSCH from the co-scheduled PUSCH(s) on a set of co-scheduled cells, wherein the PUSCH:
  in a first option, corresponds to a serving cell with smallest (or largest) cell index among the set of co-scheduled cells; or
  in a second option, corresponds to a serving cell with smallest (or largest) CIF among the set of co-scheduled cells; or
  in a third option, corresponds to a PUSCH that starts earliest (or latest) among the set of co-scheduled PUSCH(s); or
  in a fourth option, corresponds to a PUSCH that ends earliest (or latest) among the set of co-scheduled PUSCH(s); or
  in a fifth option, corresponds to a first/earliest (or last) PUSCH that satisfies the CSI processing/multiplexing timeline among the set of co-scheduled PUSCH(s) or among the subset of co-scheduled PUSCH(s) that satisfy the CSI processing/multiplexing timeline.
  in a sixth option, corresponds to a cell indicated by higher layer configuration or by the DCI format for multi-cell scheduling.

Herein, starting earliest/latest or ending earliest/latest refer to a starting or ending symbol/slot, wherein the symbol/slot is with respect to SCS configuration of the scheduling cell, or a reference SCS configuration, or a smallest (or largest) SCS configuration among the set of co-scheduled cells, and so on.

In one example, a DCI format for multi-cell scheduling of PUSCHs on a set of co-scheduled cells can include a beta offset indicator field, with a same bitwidth as in [TS 38.212 v17.1.0], such as 2 bits, when at least one of the co-scheduled cells is configured with dynamic indication of beta offset value for UCI multiplexing. For example, the UE multiplexes the UCI on only one PUSCH from the co-scheduled PUSCH(s) on a set of co-scheduled cells, wherein the PUSCH can be determined based on one of the first/second/third/fourth/fifth/sixth option, described above for CSI request field.

In one example, a DCI format for multi-cell scheduling of PUSCHs does not include an UL-SCH indicator field. For the example, the UE does not expect that a PUSCH from co-scheduled PUSCHs is transmitted only for transmission of CSI report.

In another example, a DCI format for multi-cell scheduling of PUSCHs can include an UL-SCH indicator field, and the UL-SCH indicator field applies to only one of the co-scheduled PUSCHs. For example, the UE determines a PUSCH to include UCI only based on based on one of the first/second/third/fourth/fifth/sixth option, described above for CSI request field.

In one embodiment, for a UE that is configured a number of sets of co-scheduled cells, a DCI format for multi-cell scheduling can provide complete or partial scheduling information, for cell-common or cell-specific scheduling parameters, for multiple PDSCH receptions or multiple PUSCH transmissions on respective multiple co-scheduled cells. When the DCI format for multi-cell scheduling provides partial scheduling information, the UE can determine remaining scheduling information from UE-specific RRC signaling, or by using other complementary methods.

In one example, a DCI format for multi-cell scheduling can have a same size as a DCI format for single cell scheduling. This can enable maintaining a total number of DCI format sizes when supporting multi-cell scheduling and avoid fragmentation of a number of PDCCH candidates that a UE can monitor over an increased number of DCI format sizes, thereby avoiding having a smaller number of PDCCH candidates per DCI format size. In another example, the UE does not expect to receive a DCI format for multi-cell scheduling that is same as or has a same size as a DCI format 1_0 or 0_0, as a differentiation between single-cell scheduling and multi-cell scheduling may not be possible since an additional field to provide such differentiation may not be possible to include in a DCI format 1_0 or 0_0.

In one embodiment, a DCI format for multi-cell scheduling can provide separate scheduling information by separate values of a corresponding field for each of the serving cells. A first value corresponds to a first cell, a second value corresponds to a second cell, and so on. Therefore, DCI format fields for the multiple cells are concatenated, thereby referring to such DCI format as a concatenated DCI format for multi-cell scheduling. This approach can be beneficial, for example, for co-scheduling cells that have different channel characteristics or configurations, such as for inter-band CA operation.

In one example, a concatenated DCI format for multi-cell scheduling is composed of multiple "field-blocks", wherein each field-block includes multiple values corresponding to the multiple co-scheduled cells.

In another example, a concatenated DCI format for multi-cell scheduling is composed of multiple "DCI format blocks", wherein each DCI format block provides scheduling information for a respective cell from the multiple co-scheduled cells.

Support of a concatenated DCI format for multi-cell scheduling can be restricted in the number of co-scheduled cells, such as for up to 2 cells.

In one example, a concatenated DCI format for multi-cell scheduling can exclude certain scheduling parameters compared to fields in a single-cell scheduling DCI format, wherein those parameters can be configured by higher layers. Such higher layer configuration can be per each co-scheduled cell, or per each subset of co-scheduled cells. For example, some resource allocation fields, such as PRB-to-VRB mapping, or PRB bundling, can be provided by higher layer signaling, while other fields such as a ZP CSI-RS trigger can be provided only by a single-cell scheduling DCI format.

In one example, a concatenated DCI format can include a set of cell-common scheduling information parameters wherein, for example, a block of cell-common fields can be placed first in the DCI format, followed by a number of blocks of cell-specific fields in ascending order of a cell index or CIF.

The set of cell-common scheduling information parameters can be predetermined in the specifications of the system operation, or can be provided by higher layer signaling. For example, the cell-common parameters can generally include parameters that do not relate to PDSCH receptions and in particular one or more of: a PUCCH resource indicator (PRI), a transmit power control (TPC) command for PUCCH, or a PDSCH-to-HARQ_feedback timing indicator (K1) field, or a downlink assignment information (DAI) field, when applicable. Therefore, the UE determines to transmit HARQ feedback information corresponding to the multiple PDSCH of the multiple co-scheduled cells in a same PUCCH resource as indicated by the common PRI, or with a same TPC command, or with a same K1 timeline as indicated by the K1 parameter, as indicated in the cell-common fields of the concatenated DCI format. Another cell-common parameter can be a link direction for the co-scheduled cells, to indicate that all cells are co-scheduled for DL reception (that is, multiple PDSCHs) or for UL transmission (that is, multiple PUSCHs).

In one example, for a UE configured with a set of co-scheduled cells, the UE does not expect to be configured/indicated PUCCH repetitions (at least associated with multi-TRP operation), such as for transmission of HARQ-ACK feedback information corresponding to co-scheduled PDSCHs on the set of co-scheduled cells. Therefore, the UE does not expect to be configured a second TPC command in a DCI format for multi-cell scheduling on the set of co-scheduled cells.

In another example, for a UE configured with a set of co-scheduled cells, the UE can be configured or indicated PUCCH repetitions (associated with multi-TRP operation), such as for transmission of HARQ-ACK feedback information corresponding to co-scheduled PDSCHs on the set of co-scheduled cells. Therefore, a multi-cell scheduling DCI format for the set of co-scheduled cells can include a second TPC command, that is provided in a cell-common manner. Accordingly, there is only one such field, for example 2 bits, in the DCI format.

In one example, values for some cell-specific scheduling parameters can be provided by the specifications of the system operation, or via higher layer signaling. Therefore, DCI fields corresponding to such cell-specific scheduling parameters can be absent in a concatenated DCI format for multi-cell scheduling.

In one embodiment, a UE can be provided information for multi-cell scheduling of multiple PDSCHs/PDCCHs on multiple respective cells using a multi-cell mapping, wherein a field in a DCI format can be interpreted to provide multiple values for a corresponding scheduling parameter for the multiple co-scheduled cells. Such interpretation can be based on a configured one-to-many mapping/table or based on multiple configured offset values that are applied to a reference value indicated by the DCI format. A field in a DCI format which can be interpreted based on multi-cell mapping may be referred to as a DCI field with multi-cell mapping. This approach can be beneficial, for example, for co-scheduling cells that have similar physical channel characteristics or configurations, such as for intra-band CA operation.

In one example, for any scheduling parameter corresponding to a DCI field with multi-cell mapping, a UE can be provided a predetermined or configured mapping or table, also referred to as "code-points", such that a value of the DCI field can be mapped to multiple values for the corresponding scheduling parameter. In another example, for any scheduling parameter corresponding to a DCI field with multi-cell mapping, the UE can be configured one or more adjusting parameters, such as offset values or scaling factors, so that the UE can determine one or more additional values based on adjustment of a reference value indicated by the DCI field. In all methods, each DCI field with multi-cell mapping can have a one-to-many interpretation, rather than a one-to-one interpretation.

Figure 6:
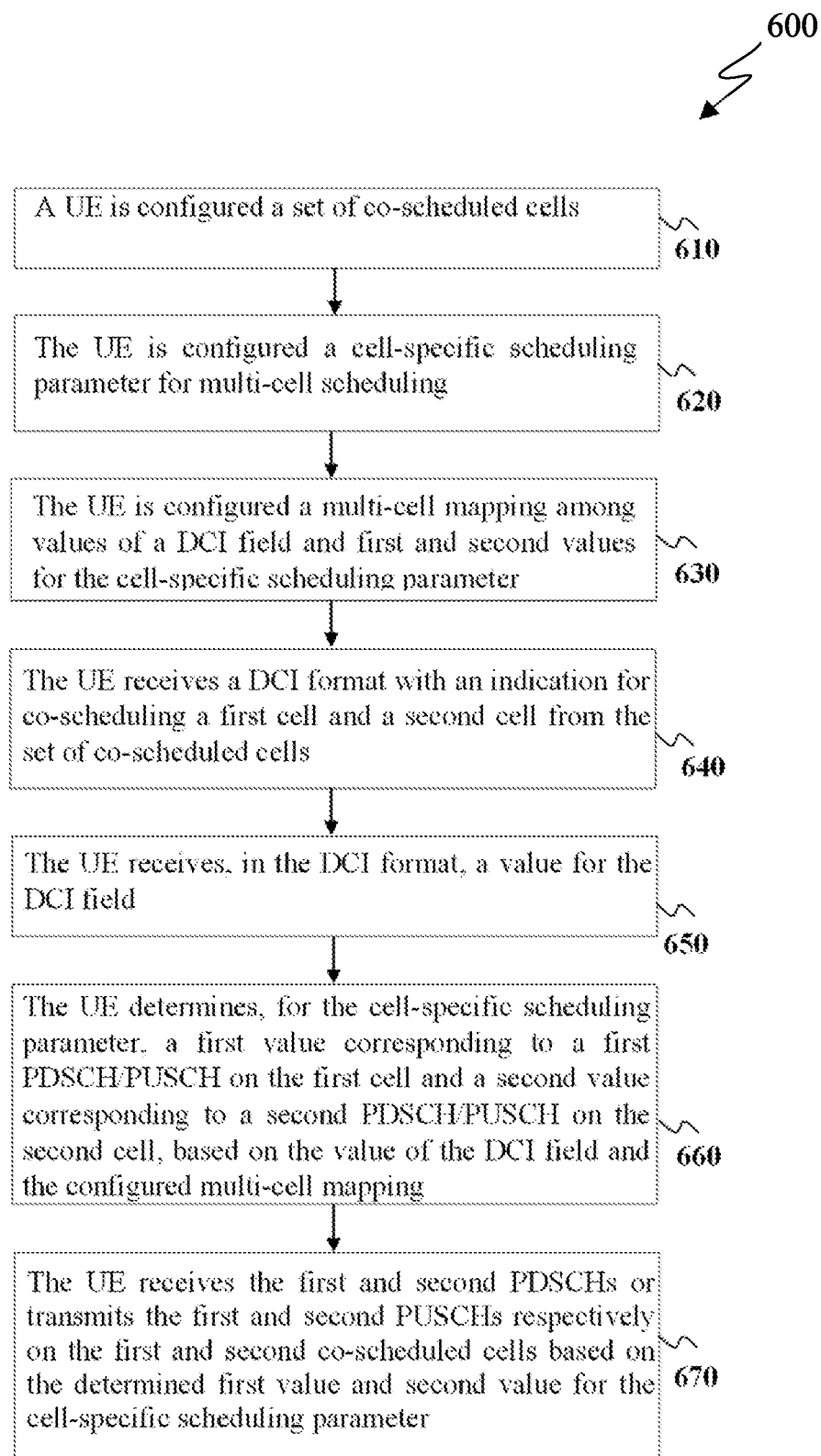
FIG. 6 illustrates a method for multi-cell scheduling based on DCI fields with multi-cell mapping, using configured one-to-many mappings/tables according to embodiments of the present disclosure.

FIG. 6 illustrates a method 600 for multi-cell scheduling based on DCI fields with multi-cell mapping, using configured one-to-many mappings/tables according to embodiments of the present disclosure. The embodiment of the method 600 for multi-cell scheduling based on DCI fields with multi-cell mapping, using configured one-to-many mappings/tables illustrated in FIG. 6 is for illustration only. FIG. 6 does not limit the scope of this disclosure to any particular implementation of the method 600 for multi-cell scheduling based on DCI fields with multi-cell mapping, using configured one-to-many mappings/tables.

As illustrated in FIG. 6, the method 600 begins at step 610, where a UE (such as the UE 116) is configured a set of co-scheduled cells. At step 620, the UE is configured a cell-specific scheduling parameter for the co-scheduled cells. At step 630, the UE is configured a multi-cell mapping among values of a DCI field and first and second values for the cell-specific scheduling parameter. At step 640, the UE receives a DCI format with an indication for co-scheduling a first cell and a second cell from the set of co-scheduled cells. At step 650, the UE receives, in the DCI format, a value for the DCI field. At step 660, the UE determines, for the cell-specific scheduling parameter, a first value corresponding to a first PDSCH/PUSCH on the first cell and a second value corresponding to a second PDSCH/PUSCH on the second cell, based on the value of the DCI field and the configured multi-cell mapping. At step 670, the UE receives the first and second PDSCHs or transmits the first and second PUSCHs, respectively, on the first and second co-scheduled cells based on the determined first value and second values for the cell-specific scheduling parameter.

In one example, for a DCI field with multi-cell mapping, a UE can be configured a table with rows corresponding to possible values of the DCI field, and columns corresponding to different interpretations of the DCI field. For example, a first column can correspond to a first/baseline interpretation/values of the DCI field, a second column can correspond to a second interpretation/values of the DCI field, and so on. For instance, if an MCS field is a DCI field with multi-cell mapping, then a first column provides first/baseline MCS values corresponding to a first/baseline MCS table for 32 possible values of a 5-bit MCS field. In one example, a second column can correspond to a second MCS table that can be separate from the first MCS table or can be obtained by variations or permutations of entries of the first MCS table.

For example, a DCI field for MCS with value '00000' can refer to a first entry of a first MCS table, and a value '00001' can refer to a second entry of the first MCS table. Then, for the case of a DCI field with multi-cell mapping, in one example, the value '00000' can refer to the first entry of the first MCS table, and the value '00001' can also refer to the first entry of the first MCS table. In another example, the value '00000' can refer to a third entry of the first MCS table, and the value '00001' can refer to a fourth entry of a second MCS table. In yet another example, the value '00000' can refer to the first entry of the first MCS table, and the value '00001' can refer to a first entry of a third MCS table.

A DCI field with multi-cell mapping can be, for example, one or more of: MCS, antenna ports (APs), TCI state, SRI, TPMI, FDRA, or TDRA, and so on.

In one example, for a DCI field with multi-cell mapping, different interpretations of the DCI field value, such as different columns of a configured table associated with the DCI field, correspond to different co-scheduled cells. For example, a UE configured for 2-cell scheduling can be provided a table with two columns, and a UE configured 4-cell scheduling can be provided a table with four columns. A first column can correspond to a first co-scheduled cell, a second column can correspond to a second co-scheduled cell, and so on. In one example, when the UE is configured a set of 4 co-scheduled cells and the UE is indicated two PDSCHs/PUSCHs on two out of the 4 co-scheduled cells, such as a first PDSCH on a first cell and a second PDSCH on a fourth cell, the UE operates with values provided in a first column and a fourth column of the configured table, for the first PDSCH and the second PDSCH, respectively, wherein the values are provided by a single value of the field in the DCI format mapping to the values in the first and fourth columns of the configured table.

Figure 7:
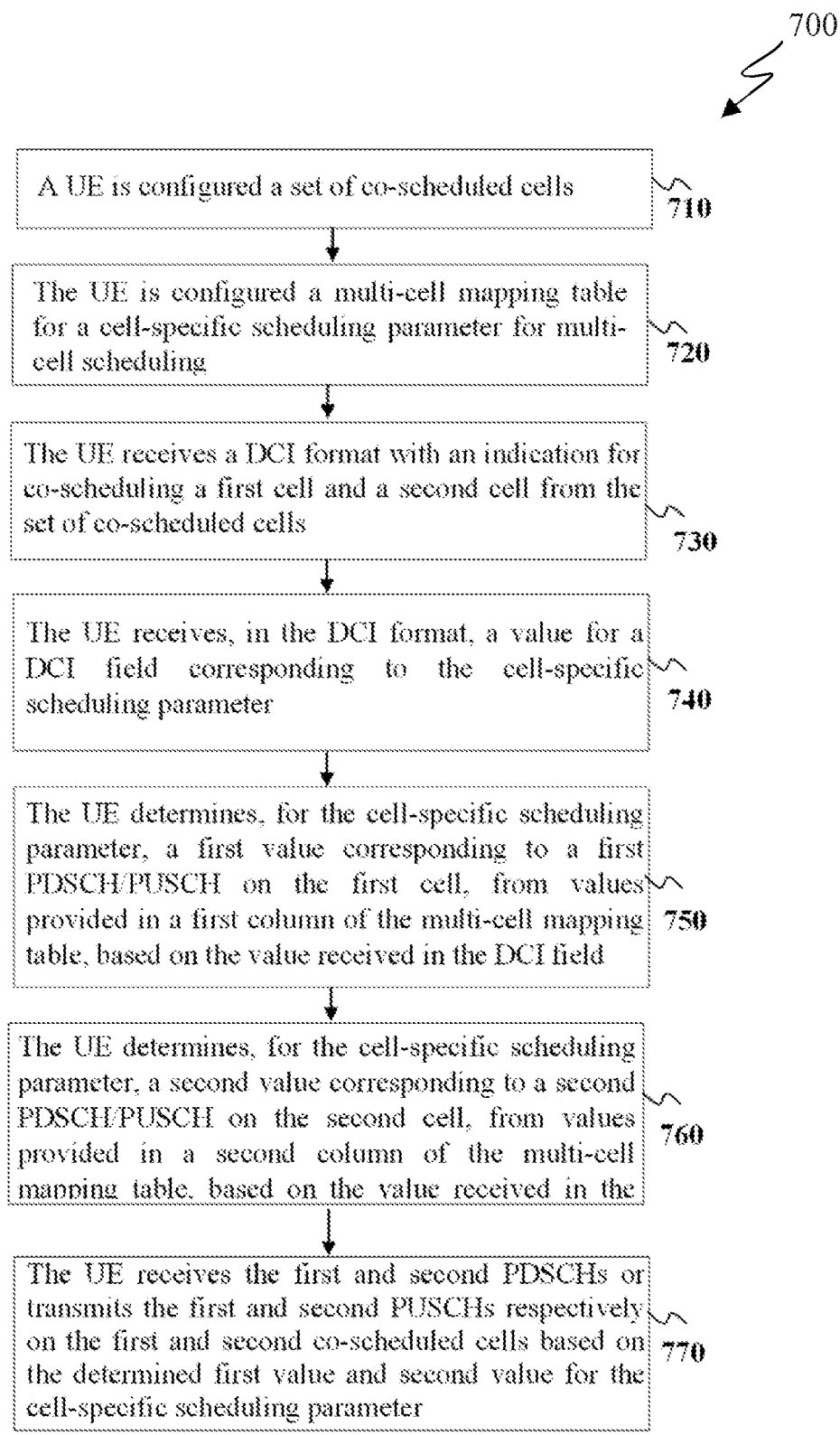
FIG. 7 illustrates a method for multi-cell scheduling based on DCI fields with multi-cell mapping table according to embodiments of the present disclosure.

FIG. 7 illustrates a method 700 for multi-cell scheduling based on DCI fields with multi-cell mapping table according to embodiments of the present disclosure. The embodiment of the method 700 for multi-cell scheduling based on DCI fields with multi-cell mapping table illustrated in FIG. 7 is for illustration only. FIG. 7 does not limit the scope of this disclosure to any particular implementation of the method 700 for multi-cell scheduling based on DCI fields with multi-cell mapping table.

As illustrated in FIG. 7, the method begins at step 710, where a UE (such as the UE 116) is configured a set of co-scheduled cells. At step 720, the UE is configured a multi-cell mapping table for a cell-specific scheduling parameter for multi-cell scheduling. At step 730, the UE receives a DCI format with an indication for co-scheduling a first cell and a second cell from the set of co-scheduled cells. At step 740, the UE receives, in the DCI format, a value for a DCI field corresponding to the cell-specific scheduling parameter. At step 750, the UE determines, for the cell-specific scheduling parameter, a first value corresponding to a first PDSCH/PUSCH on the first cell, from values provided in a first column of the multi-cell mapping table, based on the value received in the DCI field. At step 760, the UE determines, for the cell-specific scheduling parameter, a second value corresponding to a second PDSCH/PUSCH on the second cell, from values provided in a second column of the multi-cell mapping table, based on the value received in the DCI field. At step 770, the UE receives the first and second PDSCHs or transmits the first and second PUSCHs respectively on the first and second co-scheduled cells based on the determined first value and second value for the cell-specific scheduling parameter.

In one example, for a DCI field with multi-cell mapping, different interpretations of the DCI field value, such as different columns of a configured table associated with the DCI field, correspond to different levels of operation compared to a reference level. For example, a first column in the configured table refers to a reference operation level, wherein the UE can use first values of a scheduling parameter corresponding to the DCI field, while other columns refer to differential levels from the reference operation level. In another example, columns other than the first column can refer to absolute levels, instead of differential levels.

According to this method, a UE can be provided an operation level for each of the co-scheduled cells and can determine a column from the configured table for the corresponding DCI field with multi-cell mapping for each of the co-scheduled cells. Then, for interpreting the DCI field with multi-cell mapping, the UE applies a first value from a first column of the configured table corresponding to the first operation level for a first co-scheduled cell and a second value from a second column of the configured table corresponding to the second operation level for a second co-scheduled cell. The first and second operation levels can be same or different. For example, when the first operation level is same as the second operation level, the UE applies a same value from a same column of the configured table for both the first and the second co-scheduled cells.

In one example, an operation level corresponding to a DCI field with multi-cell mapping can change over time for a serving cell. For example, for interpreting the DCI field with multi-cell mapping, the UE can apply a first value from a first column of the configured table corresponding to a first operation level for a first PDSCH/PUSCH on a cell in a first slot, and apply a second value from a second column of the configured table corresponding to a second operation level for a second PDSCH/PUSCH on the cell in a second slot.

In one example, for a cell from the set of co-scheduled cells, a UE can be separately provided operation levels for different scheduling parameters, such as different column indexes in different tables, corresponding to different DCI fields with multi-cell mapping.

In another example, for a cell from the set of co-scheduled cells, a UE can be provided a common operation level for different scheduling parameters, such as a same column index in different tables, corresponding to different DCI fields with multi-cell mapping.

In one example, a UE receives information of operation level(s) corresponding to DCI fields with multi-cell mapping via higher layer signaling for each cell from the set of co-scheduled cells. Accordingly, the UE applies the configured operation level(s) when re-interpreting the DCI field with multi-cell mapping for any/all PDSCH or PUSCH scheduled on the cell by a multi-cell scheduling DCI format.

In another example, a UE receives information of operation level(s) corresponding to DCI fields with multi-cell mapping via a DCI format for multi-cell scheduling. Therefore, the UE can receive a first multi-cell scheduling DCI format indicating first operation level(s) for a first PDSCH/PUSCH on a co-scheduled cell, and receive a second multi-cell scheduling DCI format indicating second operation level(s) for a second PDSCH/PUSCH on the co-scheduled cell.

In yet another example, a UE determines information of operation level(s) corresponding to DCI fields with multi-cell mapping for scheduling a PDSCH/PUSCH on a cell from a set of co-scheduled cells based on predetermined or configured UE measurements. Herein, UE measurements can refer to RSRP or SINR measurements, and so on, of a channel or signal, such as a reference signal associated with the scheduled PDSCH/PUSCH on a scheduled cell. In one example, a reference signal associated with a PDSCH/PUSCH can refer to a SSB or CSI-RS or SRS and so on, which is QCL with PDSCH/PUSCH, such as QCL Type-D, or is provided as (part of) a downlink or uplink, separate or joint TCI state for the PDSCH/PUSCH, or is provided as a reference or target spatial relation corresponding to the PDSCH/PUSCH, or is provided as a default beam/spatial relation for the PDSCH/PUSCH.

Figure 8:
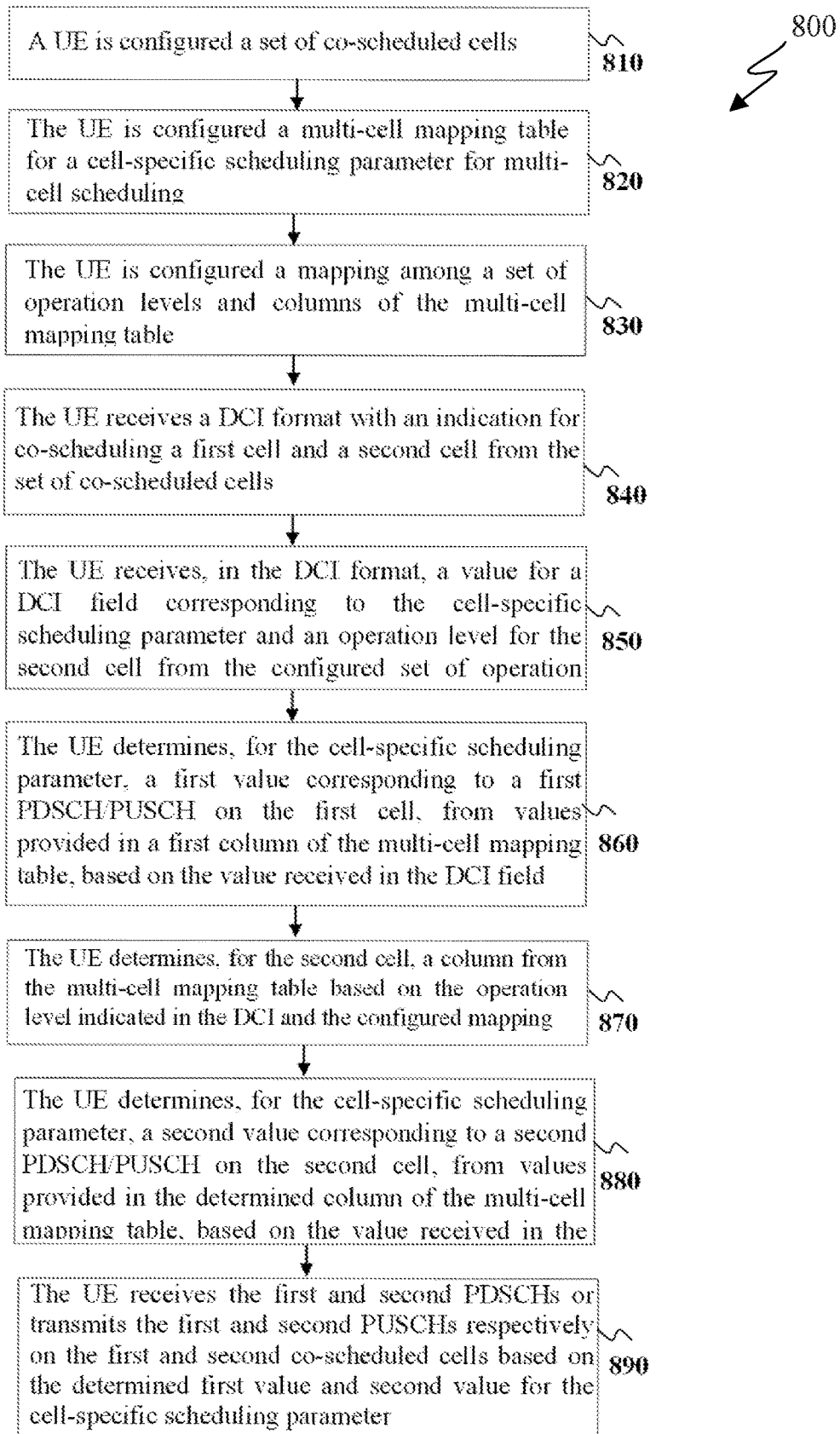
FIG. 8 illustrates a method for multi-cell scheduling based on DCI fields with multi-cell mapping along with a set of operation levels for the co-scheduled cells according to embodiments of the present disclosure.

FIG. 8 illustrates a method 800 for multi-cell scheduling based on DCI fields with multi-cell mapping along with a set of operation levels for the co-scheduled cells according to embodiments of the present disclosure. The embodiment of the method 800 for multi-cell scheduling based on DCI fields with multi-cell mapping along with a set of operation levels for the co-scheduled cells illustrated in FIG. 8 is for illustration only. FIG. 8 does not limit the scope of this disclosure to any particular implementation of the method 800 for multi-cell scheduling based on DCI fields with multi-cell mapping along with a set of operation levels for the co-scheduled cells.

As illustrated in FIG. 8, the method begins at step 810, where a UE (such as the UE 116) is configured a set of co-scheduled cells. At step 820, the UE is configured a mapping among a set of operation levels and columns of the multi-cell mapping table. At step 830, the UE is configured a mapping among a set of operation levels and columns of the multi-cell mapping table. At step 840, the UE receives a DCI format with an indication for co-scheduling a first cell and a second cell from the set of co-scheduled cells. At step 850, the UE receives, in the DCI format, a value for a DCI field corresponding to the cell-specific scheduling parameter and an operation level for the second cell from the configured set of operation levels. At step 860, the UE determines, for the cell-specific scheduling parameter, a first value corresponding to a first PDSCH/PUSCH on the first cell, from values provided in a first column of the multi-cell mapping table, based on the value received in the DCI field. At step 870, the UE determines, for the second cell, a column from the multi-cell mapping table based on the operation level indicated in the DCI and the configured mapping. At step 880, the UE determines, for the cell-specific scheduling parameter, a second value corresponding to a second PDSCH/PUSCH on the second cell, from values provided in the determined column of the multi-cell mapping table, based on the value received in the DCI field. At step 890, the UE receives the first and second PDSCHs or transmits the first and second PUSCHs respectively on the first and second co-scheduled cells based on the determined first value and second value for the cell-specific scheduling parameter, 890.

For example, a UE can be configured a mapping among a number of RSRP ranges and a set of operation levels for a DCI field with multi-cell mapping, such as a set of column indexes in a configured mapping/table for the scheduling parameter corresponding to the DCI field with multi-cell mapping. For instance, the UE can be configured with N, such as N=4, RSRP ranges corresponding to N, such as N=4, operation levels. Therefore, a first RSRP range can be mapped to a first operation level or a first column index, a second RSRP range can be mapped to a second operation level or a second column index, and so on. In one example, the UE reports a determined RSRP range or a corresponding operation level or table column index to a serving gNB, for example, via L1 signaling in a PUSCH or PUCCH or via a MAC CE.

In one example, a UE can be configured one or more adjusting parameters, such as offset values or scaling factors, so that the UE can determine one or more additional values for a scheduling parameter based on adjustment of a reference value indicated by a corresponding DCI field. For example, the UE can apply an offset on indexes of values corresponding to a scheduling parameter, or can directly apply an offset on a value of a scheduling parameter. For instance, when the UE is configured offset values in a set $O \in \{-2, -1, 0, 1, 2\}$, and a multi-cell scheduling DCI format indicates an MCS value corresponding to entry I=17 in an MCS table, an offset value O=2 refers to using an MCS value corresponding to entry I+O=17+2=19, and an offset value O=−1 refers to using an MCS value corresponding to entry I+O=17−1=16. For example, a multi-cell scheduling DCI (MC-DCI) format includes a first MCS field with size of 5 bits for a first cell in the set of co-scheduled cells, and a second (and third and fourth, if applicable) MCS fields with size of 2 bits (or 3 bits) each providing differential values to the value of the first MCS field. It is also possible that a single MCS field is defined, where first 5 bits are for a first cell, following two bits are for a second cell, following two bits are for a third cell, and so on, from the set of co-scheduled cells. Herein, the first cell in the set of co-scheduled cells can be a cell that first in the configuration of the set of co-scheduled cells, or a cell with smallest (or largest) cell index from the set of co-scheduled cells. In another example, when the UE is configured offset values in a set $O \in \{-20, -10, 0, 10, 20\}$, and a multi-cell scheduling DCI format indicates an MCS value corresponding to a coding rate with parameter R*[1024]=379 in an MCS table, an offset value O=10 refers to using an MCS value corresponding to a coding rate with parameter R*[1024]=379+10=389, and an offset value O=−20 refers to using an MCS value corresponding to a coding rate with parameter R*[1024]=379−20=359.

For example, 2 bits can be used for differential MCS when $O \in \{-2, -1, 0, 1\}$ or $O \in \{-1, 0, 1, 2\}$, or 3 bits can be used for differential MCS when $O \in \{-4, -3, -2, -1, 0, 1, 2, 3\}$ or $O \in \{-3, -2, -1, 0, 1, 2, 3, 4\}$. According to an example with $O \in \{-2, -1, 0, 1\}$, a value '00', '01', '10', or '11' in the MC-DCI format refers respectively to a differential value O=−2, O=−1, O=0, or O=1. In another example, a set of offset values for a differential MCS can be defined in the specifications of the system operation or can be provided by RRC information. For example, the UE is provided a table/sequence with 4 entries (or 8 entries) that provide four (or eight) offset O values for differential MCS that correspond to field values of {00, 01, 10, 11} (or values {000, 001, 010, 011, 100, 101, 110, 111}) for a corresponding differential MCS value in the MC-DCI format. For example, the UE can be provided a same set of offset values for differential MCS for all sets of co-scheduled cells. For example, the UE can be provided separate sets of offset values for differential MCS for different sets of co-scheduled cells.

For example, when the UE is configured scheduling of PDSCH receptions or PUSCH transmissions with up to 2 TBs, per PDSCH reception or per PUSCH transmission, on cells from a set of co-scheduled cells, the MC-DCI format includes first (differential) MCS values for first TBs of PDSCHs/PUSCHs on the cells, and includes second differential MCS values for second TBs of the PDSCHs/PUSCHs on the cells. For example, the MC-DCI format includes a field with size of 2 bits (or 3 bits) providing differential MCS of each TB from the second TBs. For example, for a set including {cell #1, cell #2, cell #3, cell #4} with PDSCH receptions or PUSCH transmission on having only 1 TB on cell #1 and cell #4 and having up to 2 TBs on cell #2 and cell #3, the MCS field of the MC-DCI format includes a reference MCS value with a size of 5 bits for a first TB of cell #1, and differential MCS values with size of 2 bits for each of first/only TB of cell #2, cell #3, and cell #4, and includes differential MCS values with size of 2 bits for each of second TBs of cell #1 and cell #4. As described earlier, for size alignment purposes, the MC-DCI format may also include a number of reserved values for MCS indication. In one example, the second differential MCS values for the second TBs are relative to corresponding first (differential) MCS values for the first TBs. In another example, the second differential MCS values for the second TBs are relative to an MCS value provided for the first TB associated with the first cell from the set of co-scheduled cells (that is, the same reference MCS that was used to determine the first differential MCS values for the first TBs). In another example, the MC-DCI format does not include MCS values for the second TBs and the UE expects to use a same MCS for first TB and for second TB of a PDSCH reception or PUSCH transmission on a cell.

In one example, a UE can be separately provided an adjusting parameter for each scheduling parameter/field of a respective multi-cell scheduling DCI format. In another example, a UE can be provided a single adjusting parameter for all scheduling parameters/fields of a respective multi-cell scheduling DCI format. In yet another example, an adjusting parameter can be provided per higher layer configuration, or can change based on indication by a multi-cell scheduling DCI format or a UE measurement of RSRP for a reference signal associated with a co-scheduled PDSCH/PUSCH. In a further example, a UE can receive an indication for an operation level, that is mapped to a number of adjusting parameters for a number of scheduling parameters/fields of a respective multi-cell scheduling DCI format, wherein the mapping is provided by higher layer signaling.

A gNB can configure a mapping/table or an adjusting parameter for reinterpretation of a DCI field with multi-cell mapping for multi-cell scheduling based on estimated combinations of parameter values across the set of co-scheduled cells. For example, for cells that have relatively similar physical channel characteristics, such as for intra-band CA operation, the gNB can configure or indicate same or similar values for various scheduling parameters such as for an FDRA, TDRA, or MCS. For enhanced operation, the gNB can determine variations of parameter values among the co-scheduled cells based on the relative operating frequencies and spatial/MIMO channel conditions, and so on, for the co-scheduled cells. For example, based on CSI reports for co-scheduled cells, the gNB can determine an MCS offset for scheduled cells from the co-scheduled cells.

In one example, a DCI field with multi-cell mapping for a scheduling parameter in a DCI format for multi-cell scheduling can have a same size as a corresponding DCI field for the same scheduling parameter in a DCI format for single cell scheduling.

In another example, a DCI field with multi-cell mapping can have a different size, for example, larger than a corresponding size in a DCI format for single-cell scheduling. For example, a DCI field with multi-cell mapping for MCS can have 6 or 7 bits. Such operation can be beneficial, for example, to support an extended mapping/table among possible values of the DCI field with multi-cell mapping (as rows in the table) and configured combinations of values of the corresponding scheduling parameter for co-scheduled cells (as columns in the table). Herein, an extended mapping/table refers to a table with extended rows, so that the UE can be provided more interpretations or combinations of values for the corresponding scheduling parameter for multi-cell scheduling.

In one example, for a single-cell scheduling DCI format, a UE is provided an MCS field of 5 bits to indicate one from a maximum of 32 MCS values from an MCS table. For a multi-cell scheduling DCI and 2 co-scheduled cells, the UE can be provided an MCS field with only 5 bits (instead of 10 bits) to indicate a pair of MCS values from up to 32 possible pairs (instead of the maximum of 32×32=1024 possible pairs) of MCS values from the MCS table. Each MCS value for a first co-scheduled cell can be linked with only one MCS value for a second co-scheduled cell. For example, the MCS value for the second cell can be same as for the first cell or can be offset by a configured value relative to the MCS value of the first cell as previously described. In general, an offset between the MCS value of a first cell and the MCS value of a second cell can depend on MCS value of the first cell. For example, a first MCS value of the first cell can have a first offset from a second MCS value of the second cell, while a third MCS value of the first cell can have a second offset from a fourth MCS value of the second cell, wherein the first offset is different from the second offset. Herein, both the first and second offsets are configured in the mapping/table. However, when the UE is configured/indicated a single adjusting parameter, such as a single offset value, instead of a general one-to-many mapping/table, the UE applies a same offset, regardless of the MCS value of the first cell.

If an MCS field in a DCI format for multi-cell scheduling has a larger size than in a DCI format for single-cell scheduling, such as 6 bits vs. 5 bits, the UE can be indicated a pair of MCS values from up to 64 possible pairs of MCS values from an MCS table. This approach provides a trade-off between additional DCI overhead (up to a maximum of 5 bits) and additional scheduling flexibility since each MCS value for a first co-scheduled cell can be linked with two or more MCS values for a second co-scheduled cell. Therefore, the 64-row table will include multiple rows with a shared/repeated value in a first column but with different values in a second column for the first and second co-scheduled cells. Herein, the first column can correspond to a first co-scheduled cell and the second column can correspond to a second co-scheduled cell. In one example, a differential MCS field of 1 bit can be provided in addition to the MCS field of 5 bits, wherein the differential MCS field value provides an offset value relative to the MCS field value. For example, a '0' value for the differential MCS field can map to a 0 value for the offset and a '1' value for the differential MCS field can map to an offset value that is specified in the system operation or is provided by higher layer signaling.

Such a DCI field with multi-cell mapping with a 2-column table can also apply for multi-cell scheduling of more than 2 cells when more than one co-scheduled cell can be associated with a column from the 2 columns in the table, such as when more than one cell shares a same operation level.

In one example, a DCI field with multi-cell mapping can refer to two or more scheduling parameters. For example, the UE can be configured a one-to-many mapping with paired entries, so that a value indicated by the DCI field with multi-cell mapping can be re-interpreted as a pair of value for a pair of parameters, for each of the co-scheduled cells. For example, a pair of scheduling parameters can include FDRA and TDRA, or can include MCS and number of antenna ports (APs).

Figure 9:
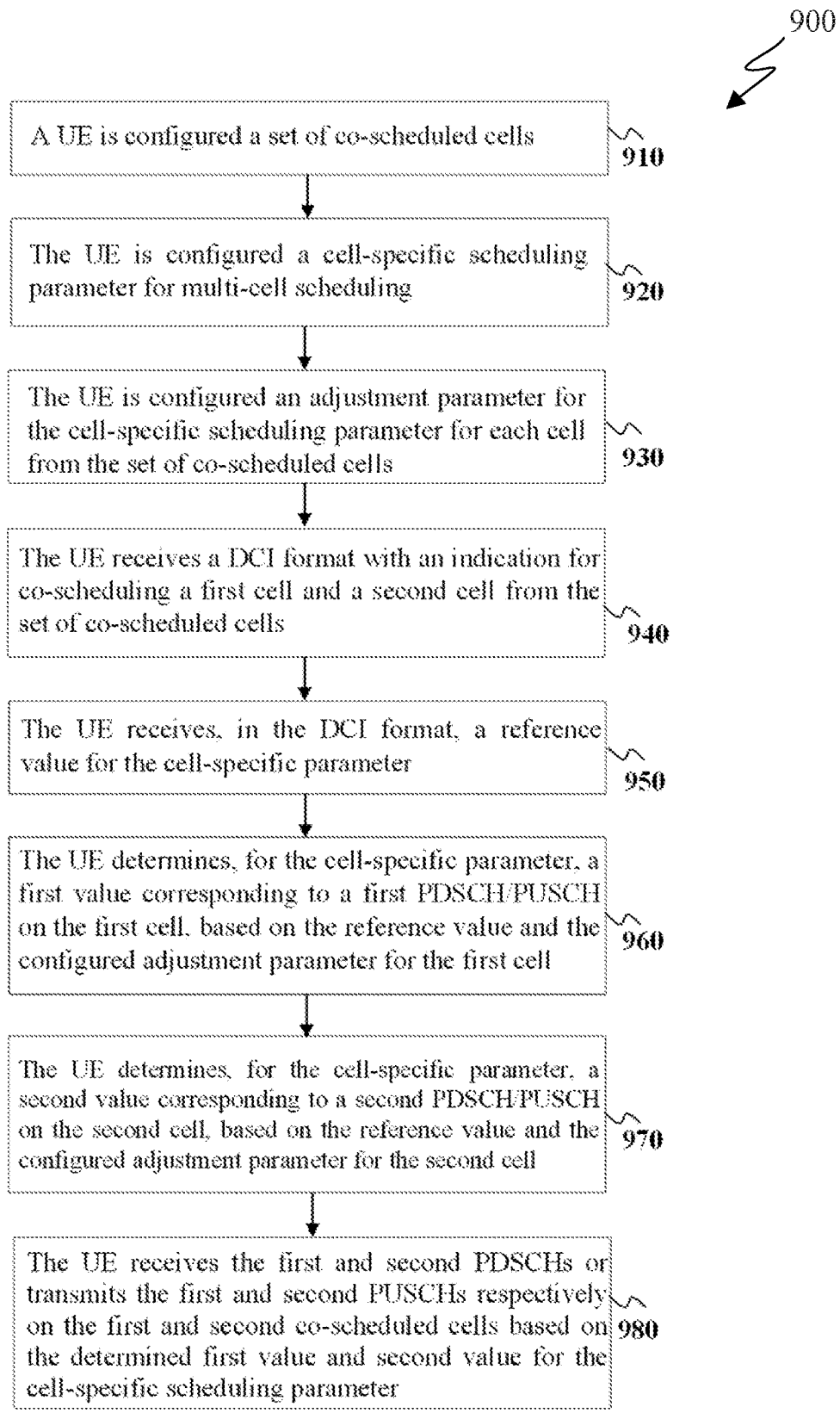
FIG. 9 illustrates a method for multi-cell scheduling based on a DCI field with multi-cell mapping, using multiple configured adjustment parameters corresponding to multiple co-scheduled cells according to embodiments of the present disclosure.

FIG. 9 illustrates a method 900 for multi-cell scheduling based on a DCI field with multi-cell mapping, using multiple configured adjustment parameters corresponding to multiple co-scheduled cells according to embodiments of the present disclosure. The embodiment of the method 900 for multi-cell scheduling based on a DCI field with multi-cell mapping, using multiple configured adjustment parameters corresponding to multiple co-scheduled cells illustrated in FIG. 9 is for illustration only. FIG. 9 does not limit the scope of this disclosure to any particular implementation of the method 900 for multi-cell scheduling based on a DCI field with multi-cell mapping, using multiple configured adjustment parameters corresponding to multiple co-scheduled cells.

As illustrated in FIG. 9, the method 900 begins at step 910, where a UE (such as the UE 116) is configured a set of co-scheduled cells. At step 920, the UE is configured a cell-specific scheduling parameter for multi-cell scheduling. At step 930, the UE is configured an adjustment parameter for the cell-specific scheduling parameter for each cell from the set of co-scheduled cells. At step 940, the UE receives a DCI format with an indication for co-scheduling a first cell and a second cell from the set of co-scheduled cells. At step 950, the UE receives, in the DCI format, a reference value for the cell-specific parameter. At step 960, the UE determines, for the cell-specific parameter, a first value corresponding to a first PDSCH/PUSCH on the first cell, based on the reference value and the configured adjustment parameter for the first cell. At step 970, the UE determines, for the cell-specific parameter, a second value corresponding to a second PDSCH/PUSCH on the second cell, based on the reference value and the configured adjustment parameter for the second cell. At step 980, the UE receives the first and second PDSCHs or transmits the first and second PUSCHs, respectively, on the first and second co-scheduled cells based on the determined first value and second value for the cell-specific scheduling parameter.

In one example, for a given scheduling parameter or DCI field (such as MCS, APs, TCI state, SRI, TPMI, FDRA, or TDRA, and so on), the UE can be provided a first multi-cell mapping or table for a first set of co-scheduled cells, and a second multi-cell mapping for a second set of co-scheduled cells. In one example, configuration of multiple multi-cell mappings is supported regardless of whether or not the first set of co-scheduled cells and the second set of co-scheduled cells share a same serving cell (that is, whether or not a first serving cell belongs to both the first set and the second set). In another example, configuration of multiple multi-cell mappings is supported only when the first set and the second set do not share any serving cell (that is, when there is no serving cell that belongs to both the first and the second sets). In yet another example, when a first set of co-scheduled cells and a second set of co-scheduled cells share a serving cell (that is, there is at least one serving cell that belongs to both the first and the second sets), the UE can be configured with a single/shared multi-cell mapping for a given scheduling parameter or DCI field that corresponds to the union of the first and second sets of co-scheduled cells. Accordingly, when the UE detects a DCI format for multi-cell scheduling of the first set of co-scheduled cells, the corresponding DCI field in the DCI format indicates an index/row of the single/shared multi-cell mapping or table, which in turn, indicates multiple parameter values for the multiple corresponding cells included in the first set of co-scheduled cells. In this example, the UE discards the parameter values indicated by the single/shared multi-cell mapping or table for the remaining serving cells that are not included in the first set of co-scheduled cells and belong only to the second set of co-scheduled cells.

In one example, various approaches described in the above embodiments can be combined. For instance:
the UE determines values of a first set of cell-common scheduling information parameters from a corresponding set of cell-common DCI fields; and
the UE determines values for a second set of cell-specific scheduling information parameters based on reinterpretation, for each of the co-scheduled cells, of a corresponding set of DCI fields with multi-cell mapping; and
the UE determines values for remaining scheduling information parameters, for each of the co-scheduled cells, per predetermined values in specifications or based on higher layer configuration.

In one example, specifications for system operation can support multiple approaches from the various approaches described in the above embodiments. For example, the UE can be configured multiple approaches for multi-cell scheduling and determine an approach from the multiple approaches based on, for example, a number of co-scheduled cells, or a measurement of reference signals associated with the multiple PDSCHs/PUSCH.

In one example, a DCI format for multi-cell scheduling or any scheduling information block or DCI field that is used for multi-cell scheduling can have a configurable size, namely bit-width.

In one embodiment, for a UE configured with a set of co-scheduled cells, the UE can be provided information of a set of 'states' (or 'codepoints') that correspond to a set of combinations of cells from the set of co-scheduled cells. Accordingly, a multi-cell scheduling DCI format can indicate the UE operation with respect to a scheduling parameter or a DCI field by indication of a state. The UE can receive a configuration of such states to be commonly applied to multiple scheduling parameters or DCI fields, or the UE can be provided different sets of states separately for each scheduling parameter or DCI field. Furthermore, the states can involve, in addition to cell combinations, parameters associated with a scheduling parameter or DCI field.

In one example, each 'state' can correspond to a subset of the set of co-scheduled cells. For example, when a UE is configured a set of co-scheduled cells such as {cell #1, cell #2, cell #3, cell #4}, the UE can be configured a state #1 corresponding to {cell #1, cell #2}, a state #2 corresponding to {cell #3, cell #4}, and a state #3 corresponding to {cell #1, cell #2, cell #4}. The specifications for system operation can introduce a limit on the maximum number of configured 'states', such as 2 or 4 states, for each set of co-scheduled cells, so that only 1 or 2 bits are needed for indication of a state.

The notion of cell-combination states can be used for various scheduling parameters or DCI fields, such as for indication of Rate matching patterns, or for triggering aperiodic ZP CSI-RS, and so on. Such applications are described in detail in the following.

In one embodiment, in a first realization, for rate matching patterns applicable to a number of co-scheduled PDSCHs, a for a field in the multi-cell scheduling DCI format that concatenates the individual rate matching indicator field needs between 4 to 8 bits, depending on whether a serving cell from the set of co-scheduled cells is configured with one or two rate matching pattern groups. For example, one or two bits for a first co-scheduled cell, and one or two bits for a second co-scheduled cell, and so on.

For example, a multi-cell scheduling DCI format based on 'states' can indicate a first state for rate matching pattern group 1, and a second state for rate matching pattern group 2. For example, the DCI format includes, for Rate matching pattern group 1, a first state ID to indicate the first state, and a second state ID to indicate a second state. For example, a DCI field value '01' for Rate matching indicator 1 indicates state ID #1, and DCI field value '10' indicates a state ID #2, and DCI field value '11' indicates state ID #3. For example, a DCI field value '00' for Rate matching indicator can indicate, in one option, a state ID #0, and in another option, can indicate no rate matching. Similar indication mechanism can apply for Rate matching pattern group 2. Therefore, the DCI format can include a total of 2+2=4 bits for Rate matching pattern indication, wherein the 2 MSBs indicate a state for Rate matching pattern group 1, and the 2 LSBs indicate a state for Rate matching pattern group 2. In another example, a number of bits can be more than 2, such as 3 or 4 bits, to accommodate configuration and indication of more states.

In another example, the UE can be configured multiple states, such as up to 8 states, and higher layer configuration (or a MAC-CE command) can indicate a table of 3 (or 4) states for the purpose of rate matching pattern groups. In such a case, the UE interprets a DCI format field for Rate matching indicator 1 as follows:
 a DCI format field '01' indicates a first state ID provided in the table of states, and
 a DCI format field '10' indicates a second state ID provided in the table of states, and
 a DCI format field '11' indicates a third state ID provided in the table of states.

The DCI field value '00' can be extended in a similar manner, for example, to indicate no rate matching, or to indicate a (zeroth or) fourth state ID provided in the table of states. Such method can be beneficial, for example, when configured states are applicable to multiple scheduling parameters or DCI fields, so that each scheduling parameter or DCI field can use a different selection of the configured states.

The UE determines that REs corresponding to configured resources in rateMatchPatternGroup1 or rateMatchPatternGroup2 are not available for a PDSCH from the number of co-scheduled PDSCHs if the UE receives a PDSCH on a cell for from the set of co-scheduled cells and the cell is included in a state corresponding to an MSB or an LSB of the Rate matching indicator field.

In the above example, a size of the Rate matching indicator field in the multi-cell DCI format can be fixed to 4 bits, that is, 2 bits for the first state and 2 bits for the second state, regardless of the indication for the rate matching patterns. For example, when the multi-cell scheduling DCI format indicates state #3 for rate matching pattern group 1, and state #1 for rate matching pattern group 2, then:
 PDSCH #1 on cell #1 is rate matched around both rate matching pattern group 1 and rate matching pattern group 2 configured for cell #1, and
 PDSCH #2 on cell #2 is rate matched around both rate matching pattern group 1 and rate matching pattern group 2 configured for cell #2, and
 PDSCH #3 on cell #3 is not rate matched, and
 PDSCH #4 on cell #4 is rate matched only around rate matching pattern group 1 configured for cell #4.

In one example, when all serving cells in a set of co-scheduled cells are configured with only one rate matching pattern group, the multi-cell scheduling DCI format can include only one state (that is, 2 bits) for the Rate matching indicator field. Accordingly, the UE determines that REs corresponding to configured resources in rateMatchPatternGroup1 are not available for a PDSCH reception from the number of co-scheduled PDSCHs if the UE receives the PDSCH on a cell for from the set of co-scheduled cells and the cell is included in a state corresponding to the Rate matching indicator field.

In the example above, if the multi-cell scheduling DCI format includes a Rate matching indicator field that indicates state #2, then:
 PDSCH #1 on cell #1 is not rate matched, and
 PDSCH #2 on cell #2 is not rate matched, and
 PDSCH #3 on cell #3 is rate matched around rate matching pattern group 1 configured for cell #3, and
 PDSCH #4 on cell #4 is rate matched around rate matching pattern group 1 configured for cell #4.

In one example, the UE expects to be configured/indicated only cell-specific (and not BWP-specific) rate matching pattern groups for the case of multi-cell scheduling on a set of co-scheduled cells.

In another example, the UE can be configured/indicated cell-specific or BWP-specific rate matching pattern groups for the case of multi-cell scheduling on a set of co-scheduled cells. In one alternative, same cell-combination states are configured regardless of (active) DL BWP(s) of serving cell(s) included in a cell combination associated with the states. For example, the UE determines a rate matching pattern group from active DL BWPs of the cells associated with an indicated state. For example, when the UE is not provided a BWP-specific rate matching pattern group on an active DL BWP of a serving cell from the cell combination that is associated with the indicated state, the UE determines that there is no rate matching pattern group to be applied to a PDSCH (from the co-scheduled PDSCHs) received in the active DL BWP of the serving cell.

In yet another example, the UE can be configured separate sets of cell-combination states in a BWP-specific manner. For example, the UE can be provided a first set of states corresponding to a first BWP combination, and a second set of states corresponding to a second BWP combination of the set of co-scheduled cells.

Herein, a BWP combination of the set of co-scheduled cells includes a first BWP for a first serving cell and a second BWP for a second serving cell, and so on, wherein the first cell and second cell and so on are from the set of co-scheduled cells. For example, for a set of co-scheduled cells with four serving cells, some examples of a BWP combination can be as follows:

for example, BWP combination #1={BWP #1 @ cell #1, BWP #1 @ cell #2, BWP #1 @ cell #3, BWP #1 @ cell #4}, for example, BWP combination #2={BWP #2 @ cell #1, BWP #1 @ cell #2, BWP #2 @ cell #3, BWP #1 @ cell #4}, for example, BWP combination #2={BWP #1 @ cell #1, BWP #2 @ cell #2, BWP #2 @ cell #3, BWP #1 @ cell #4}, etc.

In one example, the first and second options below can be extended such that trigger states can apply to multiple sets of co-scheduled cells, for example when:

a first set of co-scheduled cells is a subset of a second set of co-scheduled cells, or when a first set and a second set of co-scheduled cells have shared cell members, that is, there is at least one serving cell that is included by both the first set and the second set.

In one embodiment, in a second realization, for triggering aperiodic zero-power CSI-RS resource sets, cell combinations 'states' can be configured for triggering aperiodic zero-power CSI-RS resource sets that are considered as not available for PDSCH reception for a number of co-scheduled PDSCHs. Herein, a state can correspond to cell combinations only, or can correspond to a combination of pairs of {aperiodic ZP CSI-RS resource set ID, serving cell ID}.

In a first option for the second realization, the multi-cell scheduling DCI format can include a number of sub-fields corresponding to a number of aperiodic ZP CSI-RS resource sets configured in a BWP of each of the co-scheduled cells, wherein each sub-field indicates a cell-combination state. For example, the DCI format field for ZP CSI-RS trigger can include:

a first sub-field that includes an index of a first state that indicates first cells from a set of co-scheduled cells for which aperiodic ZP CSI-RS resource set ID #1 is triggered, and a second sub-field that includes an index of a second state that indicates second cells from the set of co-scheduled cells for which aperiodic ZP CSI-RS resource set ID #2 is triggered, and a third sub-field that includes an index of a third state that indicates third cells from the set of co-scheduled cells for which aperiodic ZP CSI-RS resource set ID #3 is triggered.

Accordingly, the UE determines that the REs indicated by the resources within the aperiodic ZP CSI-RS resource set ID #1/#2/#3 are not available for co-scheduled PDSCH(s) corresponding to serving cell(s) included in the first/second/third state, respectively.

In a first alternative, the configuration/application of states for triggering aperiodic ZP CSI-RS resource sets can be 'cell-specific' (rather than BWP-specific), so that a same state is configured/applied regardless of an active DL BWP of a serving cell that is included in a cell-combination state. It is noted that the configuration of aperiodic ZP CSI-RS resource sets is BWP-specific, and declaration of unavailable REs is based on the aperiodic ZP CSI-RS resource set configured in the active DL BWP of each serving cell (that is included in the cell-combination state). In one example, if:

the UE receives a multi-cell scheduling DCI format, and a first (respectively, second/third) sub-field of the ZP CSI-RS trigger field in the DCI format indicates a state, and a cell combination associated with the state includes a serving cell, and the UE is not provided an aperiodic ZP CSI-RS resource set #1 (respectively, #2/#3) on an active DL BWP of the serving cell, the UE does not trigger aperiodic ZP CSI-RS resource set #1 (respectively, #2/#3) on active DL BPW the serving cell. Therefore, the UE determines that REs indicated by the resources within the aperiodic ZP CSI-RS resource set ID #1 (respectively, #2/#3) are available for reception of the PDSCH (from the co-scheduled PDSCHs) received on the active DL BWP of the serving cell.

In a second alternative, the configuration/application of states for triggering aperiodic ZP CSI-RS resource sets can be BWP-specific, so that different states are configured/applied based on active DL BWPs of the serving cells included in a set of co-scheduled cells. For example, a first set of trigger states are provided for a first BWP combination of a first cell combination, and a second set of trigger states are provided for a second BWP combination of the first cell combination or a second cell combination, and so on. BWP combinations were previously described in the present disclosure.

A third alternative can be based on cell-specific configuration of states, while the UE can be provided via higher layer configuration (or MAC-CE activation) multiple different tables of selected states in a BWP-specific manner, as described further below.

In one example, a number of states included in DCI format for triggering ZP CSI-RS can be based on a maximum allowed number of aperiodic ZP CSI-RS resource sets supported in the specifications for system operation, such as 3 states corresponding to a maximum of 3 aperiodic ZP CSI-RS resource sets per BWP. Therefore, when 2 bits suffice to indicate the configured cell-combination 'states', then a size of ZP CSI-RS trigger field in the multi-cell scheduling DCI format can be fixed to 3×2=6 bits.

In another example, the number of states included in DCI format for triggering ZP CSI-RS can be based on a maximum configured number of aperiodic ZP CSI-RS resource sets across all serving cells that belong to a set of co-scheduled cells. For example, if all co-scheduled cells are configured at most one (respectively, at most two) aperiodic ZP CSI-RS resource sets per BWP, the DCI format can include only one state/sub-field (respectively, only two states/sub-fields) to indicate the cell combination(s) for which the corresponding aperiodic ZP CSI-RS resource sets are triggered.

In one example, the UE can be configured N cell-combination states, such as up to 3 or up to 7 states, to indicate multiple cell combinations. Therefore, for the DCI field for ZP CSI-RS trigger, each state/sub-field corresponding to each aperiodic ZP CSI-RS resource set includes $\lceil \log(N+1) \rceil$ bits, such as 2 or 3 bits. For example, when up to 3 cell-combination states are configured, a first (respectively, second/third) sub-field of the DCI field for ZP CSI-RS trigger can include:

a value '01' to indicate state ID #1 corresponding to first cells, or a value '10' to indicate state ID #2 corresponding to second cells, or a value '11' to indicate state ID #3 corresponding to third cells, from the set of co-scheduled cells for which the aperiodic ZP CSI-RS resource set ID #1 (respectively, ID #2/ID #3) is triggered.

For example, a value '00' for a first (respectively, second/third) sub-field of the DCI field for ZP CSI-RS trigger can be reserved to indicate that the aperiodic ZP CSI-RS resource set ID #1 (respectively, ID #2/ID #3) is not triggered for any of the serving cells from the set of co-scheduled cells.

In another example, when the UE is configured several states, such as up to 8 or 16 states, the UE can be provided via higher layer configuration (or a MAC-CE command) a table of selected states, such as up to 3 or up to 7 sub-selected states, for the purpose of triggering aperiodic ZP CSI-RS resource sets. For example, when up to 3 cell-combination states are configured, a first (respectively, second/third) sub-field of the DCI field for ZP CSI-RS trigger can include:
  a value '01' to indicate a first state ID provided in the table of selected states corresponding to first cells, or
  a value '10' to indicate a second state ID provided in the table of selected states corresponding to second cells, or
  a value '11' to indicate a third state ID provided in the table of selected states corresponding to third cells,
from the set of co-scheduled cells for which the aperiodic ZP CSI-RS resource set ID #1 (respectively, ID #2/ID #3) is triggered. A value '00' is used to indicate no trigger, as described above.

Such method can be beneficial, for example, when a first table of selected states is configured for rate matching pattern groups, as described earlier, and a second table of selected states is configured for triggering aperiodic ZP CSI-RS resource sets.

The method can be also beneficial, for example, when selected states are associated with different BWP combinations, wherein BWP combinations were previously described in the present disclosure. For example, the UE can be provided a first table of selected states corresponding to a first BWP combination of a set of co-scheduled cells, and a second table of selected states corresponding to a second BWP combination of the set of co-scheduled cells, and so on. Therefore, when active BWPs corresponding to the serving cells in the set of co-scheduled cells coincide with a first BWP combination of the set of co-scheduled cells, the UE interprets the DCI field for ZP CSI-RS trigger based on a first table of selected states.

In a second option for the second realization, the UE can be configured a set of ZP CSI-RS trigger states, wherein each ZP CSI-RS trigger state corresponds to a set of pairs of (aperiodic ZP CSI-RS resource set ID, serving cell ID). Herein, an aperiodic ZP CSI-RS resource set is configured on a corresponding serving cell as provided by the configured pair, and the serving cells belongs to the set of co-scheduled cells. Accordingly, a multi-cell scheduling DCI format indicates a trigger state from the configured set of trigger states. It is noted that, in the second option, the DCI format field for ZP CSI-RS trigger does not have separate sub-fields, as considered in the first option, since the information of aperiodic ZP CSI-RS resource sets is provided by the trigger state configuration.

For example, a trigger state can include:
  a first aperiodic ZP CSI-RS resource set on a first serving cell, and
  a second aperiodic ZP CSI-RS resource set on a second serving cell, and so on,
wherein the first and second serving cells belong to the set of co-scheduled cells. For example, a trigger state can be in the form {(aperiodic ZP CSI-RS resource set ID #2 @ cell #1), (aperiodic ZP CSI-RS resource set ID #3 @ cell #2), (aperiodic ZP CSI-RS resource set ID #3 @ cell #3)}.

In one example, a configuration of trigger states can be cell-specific, and a same set of trigger states are applicable for all BWPs of the corresponding serving cells from the set of co-scheduled cells. In another example, a configuration of trigger states can be BWP-specific. For example, a separate configuration of trigger states is provided for each BWP or each BWP combination, wherein a BWP combination is described earlier in the present disclosure.

In one example, the specifications for system operation can introduce a limit on a maximum number of N−1 trigger states (for example, with N=4 or 8 or 16 trigger states) for a set of co-scheduled cells, or for BWP combination(s) of the of co-scheduled cells. Therefore, a DCI field for ZP CSI-RS trigger can have log(N) bits, for example, 2 or 3 or 4 bits. For example, a first value of the ZP CSI-RS trigger field such as '01' (or '001') indicates a first trigger state (that is a first list of (resource set ID, Cell ID) pairs), and a second value such as '10' (or '010') indicates a second trigger state (that is a second list of (resource set ID, Cell ID) pairs), and so on.

In one example, a value '00' (or '000') of the ZP CSI-RS trigger field can be reserved to indicate no aperiodic ZP CSI-RS resource set is triggered on any of the co-scheduled PDSCHs/cells.

In one example, a bit-width of the DCI field for ZP CSI-RS trigger can be reduced by reducing a number of states corresponding to ZP CSI-RS trigger. For example, a (new) configuration of ZP CSI-RS for multi-cell scheduling can be a subset of ZP CSI-RS configuration for single-cell scheduling. For example, the ZP CSI-RS states that can be triggered by a multi-cell scheduling DCI format can be a sub-set of the ones that can be triggered by a single-cell scheduling DCI format.

In one example, the first and second methods above can be used for activation (such as by a MAC-CE command) of semi-persistent ZP CSI-RS resource sets. For example, a MAC-CE command can use cell-combination states or multi-cell trigger states to activate multiple semi-persistent ZP CSI-RS resource sets on multiple serving cells from the set of co-scheduled cells.

In one example, the first and second options below can be extended such that trigger states can apply to multiple sets of co-scheduled cells, for example when:
  a first set of co-scheduled cells is a subset of a second set of co-scheduled cells, or
  when a first set and a second set of co-scheduled cells have shared cell members, that is, there is at least one serving cell that is included by both the first set and the second set.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method comprising:
receiving first information for a set of cells;
identifying first time-domain resource allocation (TDRA) tables having a one-to-one mapping with cells in the set of cells, wherein a row of a first TDRA table from the first TDRA tables indicates time resources for reception of a physical downlink shared channel (PDSCH) on a cell in the set of cells;
receiving second information for a second TDRA table for reception of PDSCHs on cells in the set of cells;
receiving a physical downlink control channel (PDCCH) on a scheduling cell, wherein:
the PDCCH provides a downlink control information (DCI) format,
the DCI format schedules receptions of first PDSCHs on first cells, respectively, in the set of cells,
the DCI format includes a TDRA field that indicates a first row of the second TDRA table,
the first row comprises first entries having a one-to-one mapping with the first cells, and
an entry, from the first entries, indicates a row from the first TDRA table;
determining first time resources for the receptions of the first PDSCHs on the first cells based on the first entries, respectively, of the first row of the second TDRA table; and
receiving the first PDSCHs on the first cells in the first time resources, respectively.

2. The method of claim 1, further comprising:
transmitting an indication for a maximum number of sets of cells that can be scheduled from the scheduling cell, wherein:
the DCI format includes a field that indicates the set of cells,
the field comprises ceiling(log 2(N_set)) bits, and
N_set is a number of sets of cells that is scheduled from the scheduling cell and is not larger than the maximum number of sets of cells.

3. The method of claim 1, further comprising:
receiving third information for a number N_cell_combo of combinations of cells from the set of cells, wherein:
the first cells correspond to a first combination of cells from the number of N_cell_combo combinations of cells,
the DCI format includes a field that indicates the first combination of cells, and
the field comprises ceiling(log 2(N_cell_combo)) bits.

4. The method of claim 1, further comprising:
receiving third information that indicates parameters associated with aperiodic zero-power channel state information reference signal (ZP CSI-RS) resource sets on each cell from the set of cells;
receiving fourth information for a table, wherein:
the DCI format includes a field that indicates a row of the table that comprises entries having a one-to-one mapping with the first cells, and
a value for an entry from the entries indicates an aperiodic ZP CSI-RS resource set, from the aperiodic ZP CSI-RS resource sets, on a cell from the first cells; and
determining first parameters for first aperiodic ZP-CSI RS resource sets based on the entries of the row of the table,
wherein receiving the first PDSCHs further comprises receiving the first PDSCHs based on the first parameters.

5. The method of claim 1, further comprising:
receiving third information for bandwidth parts (BWPs) for each cell from the set of cells; and
identifying, based on a BWP indicator field in the DCI format, a BWP index for respective first BWPs of the first cells,
wherein receiving the first PDSCHs further comprises receiving the first PDSCHs on the respective first BWPs.

6. The method of claim 1, further comprising:
receiving third information for a number of combinations of cells from the set of cells;
determining a bit-width of a field in the DCI format as $M_{max}$ bits, wherein:
the field is associated with transport blocks (TBs) of PDSCH receptions on a combination of cells from the set of cells, and
$M_{max}$ is a maximum bit-width of the field over the number of combinations of cells;
determining first M bits, from the $M_{max}$ bits, wherein M is a bit-width corresponding to TBs of PDSCH receptions on the first cells; and
discarding last ($M_{max}$–M) bits from the $M_{max}$ bits.

7. The method of claim 6, wherein the field is one of:
a redundancy version (RV) field,
a new data indicator (NDI) field, or
a modulation and coding scheme (MCS) field.

8. A user equipment (UE) comprising:
a transceiver configured to receive first information for a set of cells; and
a processor operably coupled to the transceiver, the processor configured to identify first time-domain resource allocation (TDRA) tables having a one-to-one mapping with cells in the set of cells, wherein a row of a first TDRA table from the first TDRA tables indicates time resources for reception of a physical downlink shared channel (PDSCH) on a cell in the set of cells,
wherein:
the transceiver is configured to receive:
second information for a second TDRA table for reception of PDSCHs on cells in the set of cells, and
a physical downlink control channel (PDCCH) on a scheduling cell,
the PDCCH provides a downlink control information (DCI) format,
the DCI format schedules receptions of first PDSCHs on first cells, respectively, in the set of cells,
the DCI format includes a TDRA field that indicates a first row of the second TDRA table,
the first row comprises first entries having a one-to-one mapping with the first cells,
an entry, from the first entries, indicates a row from the first TDRA table,
the processor is further configured to determine first time resources for the receptions of the first PDSCHs on the first cells based on the first entries, respectively, of the first row of the second TDRA table, and
the transceiver is further configured to receive the first PDSCHs on the first cells in the first time resources, respectively.

9. The UE of claim 8, wherein:
the transceiver is further configured to transmit an indication for a maximum number of sets of cells that can be scheduled from the scheduling cell,
the DCI format includes a field that indicates the set of cells,
the field comprises ceiling(log 2(N_set)) bits, and
N_set is a number of sets of cells that is scheduled from the scheduling cell and is not larger than the maximum number of sets of cells.

10. The UE of claim 8, wherein:
the transceiver is further configured to receive third information for a number N_cell_combo of combinations of cells from the set of cells,
the first cells correspond to a first combination of cells from the number of N_cell_combo combinations of cells,
the DCI format includes a field that indicates the first combination of cells, and
the field comprises ceiling(log 2(N_cell_combo)) bits.

11. The UE of claim 8, wherein:
the transceiver is further configured to receive:
third information that indicates parameters associated with aperiodic zero-power channel state information reference signal (ZP CSI-RS) resource sets on each cell from the set of cells, and
fourth information for a table,
the DCI format includes a field that indicates a row of the table that comprises entries having a one-to-one mapping with the first cells,
a value for an entry from the entries indicates an aperiodic ZP CSI-RS resource set, from the aperiodic ZP CSI-RS resource sets, on a cell from the first cells,
the processor is further configured to determine first parameters for first aperiodic ZP-CSI RS resource sets based on the entries of the row of the table, and
the transceiver is further configured to receive the first PDSCHs based on the first parameters.

12. The UE of claim 8, wherein:
the transceiver is further configured to receive third information for bandwidth parts (BWPs) for each cell from the set of cells;
the processor is further configured to identify, based on a BWP indicator field in the DCI format, a BWP index for respective first BWPs of the first cells; and
the transceiver is further configured to receive the first PDSCHs on the respective first BWPs.

13. The UE of claim 8, wherein:
the transceiver is further configured to receive third information for a number of combinations of cells from the set of cells; and
the processor is further configured to:
determine a bit-width of a field in the DCI format as $M_{max}$ bits, wherein the field is associated with transport blocks (TBs) of PDSCH receptions on a combination of cells from the set of cells and $M_{max}$ is a maximum bit-width of the field over the number of combinations of cells,
determine first M bits, from the $M_{max}$ bits, wherein M is a bit-width corresponding to TBs of PDSCH receptions on the first cells, and
discard last ($M_{max}$−M) bits from the $M_{max}$ bits.

14. The UE of claim 13, wherein the field is one of:
a redundancy version (RV) field,
a new data indicator (NDI) field, or
a modulation and coding scheme (MCS) field.

15. A base station comprising:
a transceiver configured to transmit first information for a set of cells; and
a processor operably coupled to the transceiver, the processor configured to identify first time-domain resource allocation (TDRA) tables having a one-to-one mapping with cells in the set of cells, wherein a row of a first TDRA table from the first TDRA tables indicates time resources for transmission of a physical downlink shared channel (PDSCH) on a cell in the set of cells,
wherein:
the transceiver is configured to transmit:
second information for a second TDRA table for transmission of PDSCHs on cells in the set of cells, and
a physical downlink control channel (PDCCH) on a scheduling cell,
the PDCCH provides a downlink control information (DCI) format, and
the DCI format schedules transmissions of first PDSCHs on first cells, respectively, in the set of cells,
the DCI format includes a TDRA field that indicates a first row of the second TDRA table,
the first row comprises first entries having a one-to-one mapping with the first cells,
an entry, from the first entries, indicates a row from the first TDRA table,
the processor is further configured to determine first time resources for the transmissions of the first PDSCHs on the first cells based on the first entries, respectively, of the first row of the second TDRA table, and
the transceiver is further configured to transmit the first PDSCHs on the first cells in the first time resources, respectively.

16. The base station of claim 15, wherein:
the transceiver is further configured to receive an indication for a maximum number of sets of cells that can be scheduled from the scheduling cell,
the DCI format includes a field that indicates the set of cells,
the field comprises ceiling(log 2(N_set)) bits,
N_set is a number of sets of cells that is scheduled from the scheduling cell and is not larger than the maximum number of sets of cells.

17. The base station of claim 15, wherein:
the transceiver is further configured to transmit third information for a number N_cell_combo of combinations of cells from the set of cells,
the first cells correspond to a first combination of cells from the number of N_cell_combo combinations of cells,
the DCI format includes a field that indicates the first combination of cells, and
the field comprises ceiling(log 2(N_cell_combo)) bits.

18. The base station of claim 15, wherein:
the transceiver is further configured to transmit:
third information that indicates parameters associated with aperiodic zero-power channel state information reference signal (ZP CSI-RS) resource sets on each cell from the set of cells, and fourth information for a table, the DCI format includes a field that indicates a row of the table that comprises entries having a one-to-one mapping with the first cells, a value for an entry from the entries indicates an aperiodic ZP CSI-RS resource set, from the aperiodic ZP CSI-RS resource sets, on a cell from the first cells, the processor is further configured to determine first parameters for first aperiodic ZP-CSI RS resource sets based on the entries of the first row of the table, and the transceiver is further configured to transmit the first PDSCHs based on the first parameters.

19. The base station of claim 15, wherein:

the transceiver is further configured to transmit third information for bandwidth parts (BWPs) for each cell from the set of cells, a BWP indicator field in the DCI format indicates a BWP index for respective first BWPs of the first cells, and the transceiver is further configured to transmit the first PDSCHs on the respective first BWPs.

20. The base station of claim 15, wherein:

the transceiver is further configured to transmit third information for a number of combinations of cells from the set of cells;

the processor is further configured to:

determine a bit-width of a field in the DCI format as $M_{max}$ bits, wherein the field is associated with transport blocks (TBs) of PDSCH transmissions on a combination of cells from the set of cells and $M_{max}$ is a maximum bit-width of the field over the number of combinations of cells, determine first M bits, from the $M_{max}$ bits, wherein M is a bit-width corresponding to TBs of PDSCH transmissions on the first cells, and discard last ($M_{max}$-M) bits from the $M_{max}$ bits; and the field is one of:

a redundancy version (RV) field, a new data indicator (NDI) field, or a modulation and coding scheme (MCS) field.

\* \* \* \* \*